United States Patent
Ukishima

(10) Patent No.: US 8,848,257 B2
(45) Date of Patent: Sep. 30, 2014

(54) COLOR PREDICTION METHOD, COLOR CONVERSION LOOKUP TABLE GENERATION METHOD, IMAGE PROCESSING METHOD AND IMAGE PROCESSING APPARATUS

(71) Applicant: FUJIFILM Corporation, Tokyo (JP)

(72) Inventor: Masayuki Ukishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 6 days.

(21) Appl. No.: 13/714,212

(22) Filed: Dec. 13, 2012

(65) Prior Publication Data

US 2013/0155468 A1  Jun. 20, 2013

(30) Foreign Application Priority Data

Dec. 19, 2011  (JP) ................. 2011-277351

(51) Int. Cl.
*H04N 1/40* (2006.01)
*H04N 1/60* (2006.01)
*H04N 1/52* (2006.01)

(52) U.S. Cl.
CPC ............... *H04N 1/603* (2013.01); *H04N 1/52* (2013.01); *H04N 1/6033* (2013.01)
USPC .......................... 358/3.26; 358/504; 382/167

(58) Field of Classification Search
CPC . H04N 1/6033; H04N 1/6097; H04N 1/6052; H04N 1/56; H04N 1/60; H04N 1/603; H04N 1/605; B41J 11/42; B41J 29/393; B41J 2/195; B41J 2/2132

USPC .......... 358/1.1, 1.9, 2, 1, 406, 504, 468, 400, 358/500, 518, 3.26; 347/43, 15, 19, 12, 40; 382/162, 167
See application file for complete search history.

(56) References Cited

U.S. PATENT DOCUMENTS

| 6,178,007 B1 * | 1/2001 | Harrington ................. 358/1.9 |
| 7,630,106 B2 * | 12/2009 | Kuhn et al. .................. 358/504 |
| 8,358,441 B2 * | 1/2013 | Chang et al. ................ 358/2.1 |
| 2004/0027406 A1 | 2/2004 | Nishikawa et al. |

FOREIGN PATENT DOCUMENTS

| JP | 2004-058623 A | 2/2004 |
| JP | 2009-130846 A | 6/2009 |

OTHER PUBLICATIONS

An Office Action; "Notification of Reasons for Rejection," issued by the Japanese Patent Office on Jan. 23, 2014, which corresponds to Japanese Patent Application No. 2011-277351 and is related to U.S. Appl. No. 13/714,212; with English language partial translation.

* cited by examiner

*Primary Examiner* — Thomas D Lee
*Assistant Examiner* — Stephen M Brinich
(74) *Attorney, Agent, or Firm* — Studebaker & Brackett PC

(57) ABSTRACT

According to the present invention, even if the coloring material use amount is limited but ambiguities remain and an accurate coloring material use limit is not known, then a virtual coloring material use limit is set artificially, the color measurement values of virtual patches in a region that exceeds the coloring material use limit are inferred by extrapolation and the color measurement values in the region exceeding the coloring material use limit are predicted by interpolation using the inferred color measurement values. Therefore, it is possible to predict colors in relation to any input exceeding the coloring material use limit.

8 Claims, 15 Drawing Sheets

COLOR PREDICTION METHOD, COLOR CONVERSION LOOKUP TABLE GENERATION METHOD, IMAGE PROCESSING METHOD AND IMAGE PROCESSING APPARATUS

BACKGROUND OF THE INVENTION

1. Field of the Invention

The present invention relates to a color prediction method, a color conversion lookup table generation method, an image processing method and an image processing apparatus, and more particularly, to color correction technology for image forming data in color image formation.

2. Description of the Related Art

In general, in an inkjet recording apparatus or an image forming apparatus based on an electrophotographic method, a plurality of coloring materials, such as yellow (Y), magenta (M), cyan (C) and black (K) are used. The color space achieved by these coloring materials is different to that of the original image data, and therefore color conversion (color correction) processing is carried out in order to faithfully reproduce the colors and tones represented by the original image data.

On the other hand, depending on the characteristics of the output medium for image formation, there are limits on the amount of coloring material that can be received by the medium. For example, when forming a color image on a paper medium using an inkjet recording apparatus, deformation of the paper medium occurs if ink of an amount exceeding the amount that can be absorbed by the paper medium is deposited thereon. Due to this deformation of the paper medium, there is a risk of the occurrence of conveyance abnormalities of the paper medium, and decline in the quality of an image formed on the paper medium.

Furthermore, even if the paper does not deform, when an excessive amount of coloring material is used, coloring material may not be fixed satisfactorily on the medium, leading to degradation of the film properties and reduced resistance to rubbing, and problems such as transfer to the rear surface of other media may occur when media are stacked after image formation.

Japanese Patent Application Publication No. 2004-58623 discloses a method according to which, when generating a color separation table (a table used for color separation processing to calculate a coloring material use amount from signal values) on the basis of data obtained by color measurement of patches, if there is a patch having a coloring material use amount greater than a maximum overall coloring material use amount specified on the basis of the ink absorption characteristics of a recording medium, and the like, then a color separation table within the range of the maximum overall coloring material use amount is generated by compressing the signal values in such a manner that all of the patches come within the range of the maximum overall coloring material use amount.

SUMMARY OF THE INVENTION

However, the method for generating a color separation table disclosed in Japanese Patent Application Publication No. 2004-58623 involves the following problems. More specifically, it is difficult to accurately determine a maximum overall coloring material use amount in advance, and ambiguities often remain.

Furthermore, if the maximum overall coloring material use amount changes, then it may be necessary to generate a chart (patches) on the basis of the changed maximum overall coloring material use amount, and to output the chart, perform color measurement of the output chart and then regenerate a color separation table from these color measurement results.

In particular, if the maximum overall coloring material use amount increases, then data which is not present in the already generated color separation table becomes necessary, and it is essential to regenerate the color separation table. For example, if the maximum overall coloring material use amount is changed due to change in the type and thickness of the recording medium (including cases where the thickness is changed without changing the type of recording medium), or hardware modifications due to improvements in the conveyance mechanism, or the like, then the color separation table must be regenerated on the basis of the new maximum overall coloring material use amount, and this is extremely inefficient.

The present invention was devised in view of these circumstances, an object thereof being to provide a color prediction method, a color conversion lookup table generation method, an image processing method and an image processing apparatus which enables highly accurate color prediction, on the basis of color measurement values of patches formed so as to avoid deposition of an excessive amount of coloring material.

Claim 1

According to the present invention, even if the coloring material use amount is limited but ambiguities remain and an accurate coloring material use limit is not known, then a virtual coloring material use limit is set artificially, the color measurement values of virtual patches in a region that exceeds the coloring material use limit are inferred by extrapolation and the color measurement values in the region exceeding the coloring material use limit are predicted by interpolation using the inferred color measurement values. Therefore, it is possible to predict colors in relation to any input exceeding the coloring material use limit.

Moreover, since the prediction accuracy is especially high in the case of color measurement values in a region in the vicinity of the provisional coloring material use limit, then even if the coloring material use limit has changed, it is not necessary to carry out a series of processes involving the creation of a group of patches, output of a group of patches and color measurement.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Overview of Color Prediction Method

Figure 1:
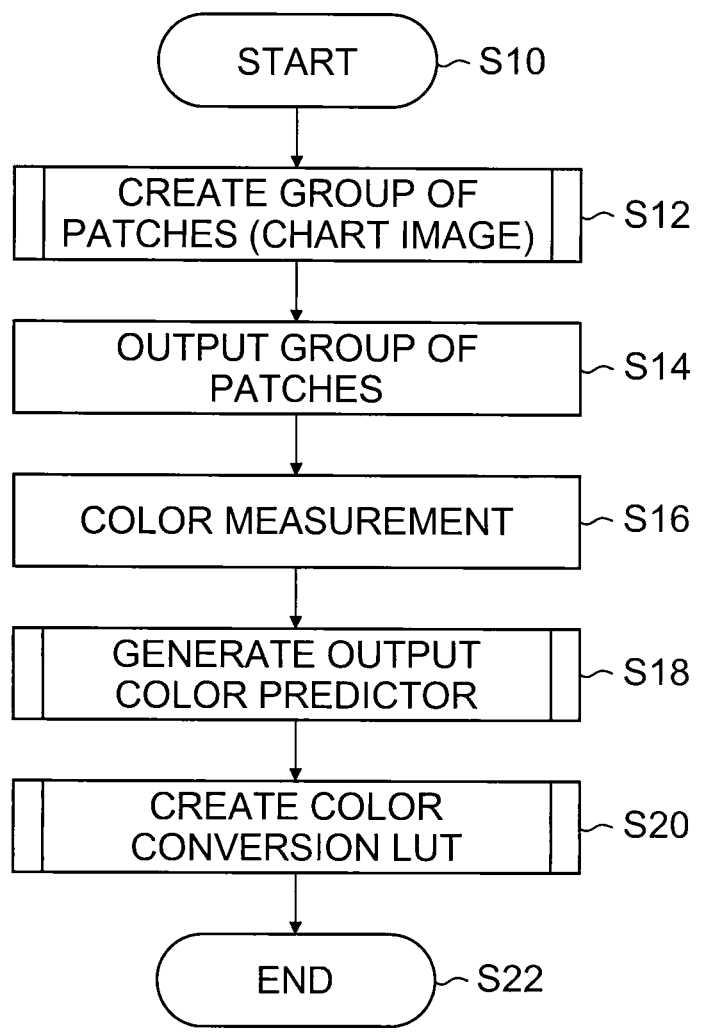
FIG. 1 is a flowchart showing a schematic composition of a color prediction method relating to an embodiment of the present invention.

FIG. 1 is a flowchart showing a general composition of a color prediction method (color conversion lookup table (LUT) creation method) relating to an embodiment of the present invention. The color prediction method described below is technology used in the prediction of output colors corresponding to input data, in order to correct differences in output colors caused by individual output color characteristics of an image forming apparatus.

The color prediction method shown in FIG. 1 is constituted by a patch group creating step of creating a group of patches (a chart image) for analyzing the output color characteristics of a printer (image forming apparatus) (step S12), a patch group output step of outputting a group of patches created by the step S12 to a medium (step S14), a color measurement step of performing color measurement of the group of patches output to the medium (step S16), and an output color predictor generating step (step S18) of generating an output color predictor for predicting color measurement values in a color space, on the basis of color measurement results of the color measurement step in step S16.

Furthermore, the color prediction method also includes a step of predicting a color measurement value corresponding to any input signal value, using the output color predictor generated in step S18, and a color conversion LUT generating step which is a step of creating a color conversion LUT for converting device-dependent colors into device-independent colors, or a step of creating a color conversion LUT for performing the opposite, namely, converting device-independent colors into device-dependent colors (step S20).

Each of the steps from S12 to S20 shown in FIG. 1 is described in detail below, in order of implementation.
(Patch Group (Chart Image) Creating Step)

Figure 2:
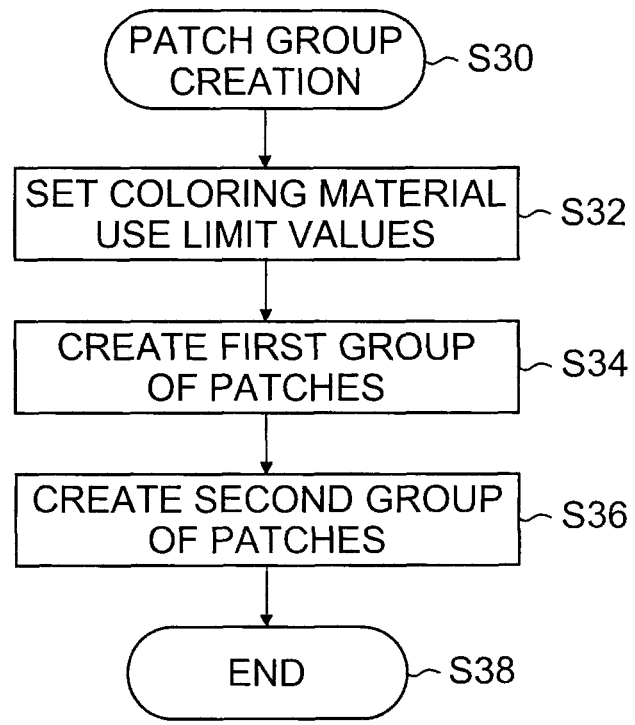
FIG. 2 is a flowchart showing details of a patch group creating step shown in FIG. 1.

Firstly, a group of patches (chart image) for analyzing output color characteristics in image formation is created. FIG. 2 is a flowchart showing details of the patch group creating step in FIG. 1 (step S12).

The patch group creating step shown in FIG. 2 includes: a coloring material use limit setting step (step S32) of setting a provisional use limit value for coloring material, a first patch group creating step (step S34) of creating a first group of patches in respect of a whole range (from 0% to 400% in the case of using four colors), without consideration of the provisional use limit value for the coloring material set in step S32, and a second patch group creating step (step S36) of creating a second group of patches in which a group of patches in a range exceeding the provisional use limit value of the coloring material is removed from the first group of patches created in step S34.

For example, in color image formation using cyan (C), magenta (M), yellow (Y) and black (K), if the maximum use amount of the coloring material of each color is taken to be 100%, then the total maximum use amount for the four colors will be 400%.

In image formation based on an inkjet method, if inks of four colors are used in the vicinity of the maximum use value, then the paper may not be able to absorb the inks which are deposited in superimposed fashion and hence the colors of the patches are not reproduced accurately, the film properties may decline due to the deposition of excessive ink, and the paper may also produce distortion due to the deposition of excessive ink, leading to problems with conveyance of the paper.

On the other hand, if the maximum usable amount of the ink can be ascertained in advance, then although it is possible to create a group of patches under the restrictions of this maximum usable amount of ink, it is difficult to accurately determine the maximum usable amount of ink for each respective combination of apparatus and paper (medium), and hence ambiguities often remain.

Furthermore, the maximum usable amount of ink may change with the type of ink, or due to changes in the paper (the paper thickness) or hardware improvements in the apparatus.

Therefore, in the color prediction method illustrated in the present embodiment, firstly, a provisional coloring material use limit is set, which is a maximum usable amount of ink that still includes ambiguities (step S32). For example, in a color space of n dimensions, n×100% is set as the maximum value (%), and the provisional coloring material use limit is set as a percentage relating to that maximum value (for example, 250% in the case of a four-dimensional color space).

Thereupon, a first group of patches is created in a range from a minimum use amount (0%) to a maximum use amount (100%) of each color ink (step S34). The first group of patches created in step S34 are virtual patches which are not actually output.

Moreover, when the first group of patches has been created in step S34, a second group of patches is created by removing a group of patches in a range exceeding the coloring material use limit set in step S32, from the first group of patches (step S36), whereupon the patch group creating step terminates (step S38).

In other words, a first group of patches relating to the whole range of the multi-dimensional color space is created in step S34, without giving consideration to the coloring material use limit set in step S32, and then, in step S36, a second group of patches relating to a range not exceeding the coloring material use limit is created on the basis of this first group of patches.

The second group of patches is not shown in the drawing, but includes a monochromatic multiple tone section, a color prediction base grid point section and an extrapolation calculation learning section. Below, each of the sections which makes up the second group of patches is described with reference to FIG. 3.

Figure 3:
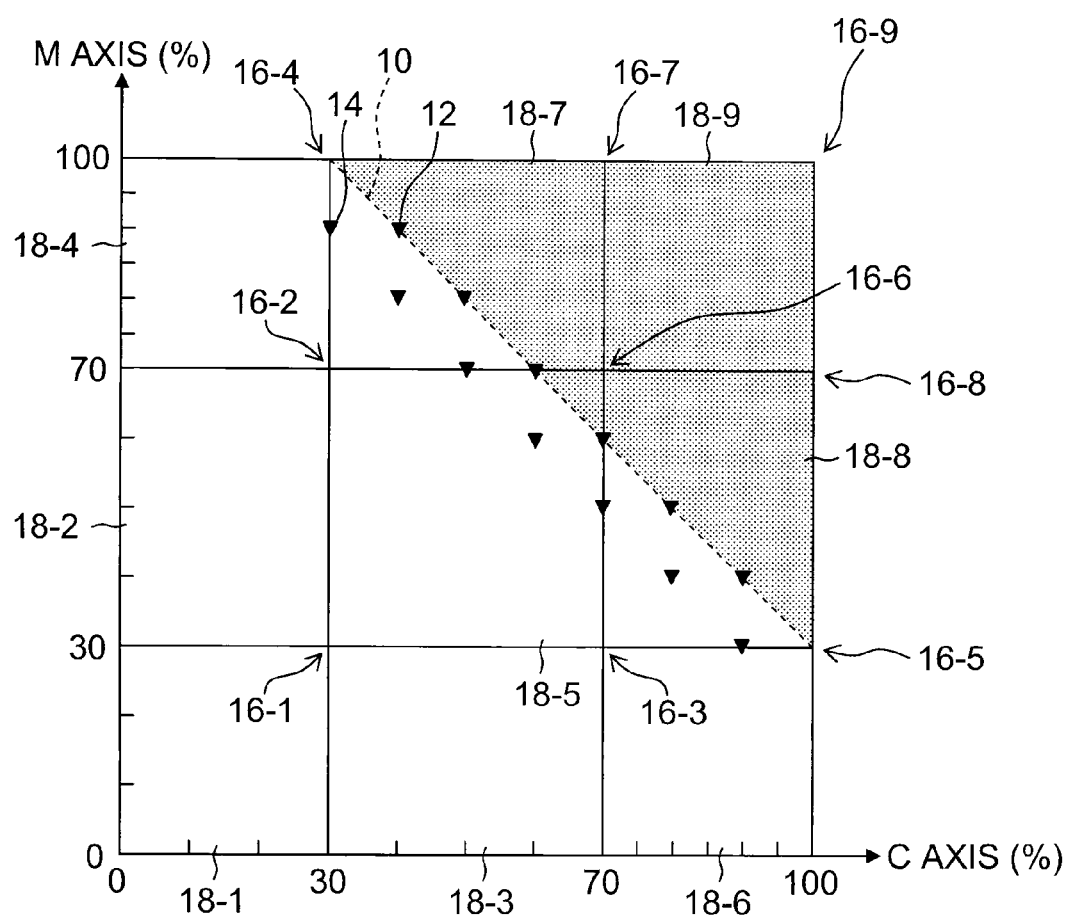
FIG. 3 is an illustrative diagram showing a schematic view of a two-dimensional (CM) color space.

FIG. 3 is an illustrative diagram showing a schematic view of a two-dimensional color space which is composed by cyan (C) and magenta (M). In FIG. 3, a two-dimensional color space is adopted in order to simplify the description (and the illustration), but in actual image formation using coloring materials of n colors (where n is a positive integer), an n-dimensional color space is created.

The dotted line labeled with reference numeral 10 in FIG. 3 indicates a provisional coloring material use limit (130% with respect to a maximum value of 200%), and the region with dot hatching in FIG. 3 indicates a range exceeding the coloring material use limit. Furthermore, the black triangular symbols labeled with reference numerals 12 and 14 represent color measurement values (color values) corresponding to the patches of the extrapolation calculation learning section (which is described in detail below).

(Monochromatic Multiple Tone Section)

Firstly, the monochromatic tone section will be described. The monochromatic tone section is constituted by a plurality of monochromatic patches which are created by altering the ideal halftone dot area ratio (details of the "ideal halftone dot area ratio" are described below) for each of the colors used. For example, in four-color image formation using the colors CMYK, this section includes patches having respective ideal halftone dot area ratios of 0%, 5%, 10%, . . . , 100%, for each of the colors CMYK.

The color measurement values for these patches are used as input data for monochromatic dot gain correction processing (for example, as a scale for each color axis of the color space shown in FIG. 3). The monochromatic dot gain correction processing is processing for correcting non-linearity in the variation of the color measurement value (or effective halftone dot area ratio) in response to variation in the ideal halftone dot area ratio (This processing will be described in detail later).

It is possible to improve the correction accuracy of the monochromatic dot gain correction processing, by creating ideal halftone dot area ratios in finer increments for each of the patches making up the monochromatic tone section. Furthermore, the increments of the ideal halftone dot area ratios of the patches do not necessarily have to be even increments. For example, if tones which produce a large non-linearity in the variation of the color measurement value with respect to increase in the ideal halftone dot area ratio are known in advance (for example, in the vicinity of the maximum value and the vicinity of the minimum value), then it is possible to improve the correction accuracy without increasing the overall number of patches by setting finer increments of the ideal halftone dot area ratio in the patches only in the vicinity of these tones.

As shown in FIG. 3, patches are formed in respect of both cyan (C) and magenta (M), in 10% increments of the ideal halftone dot area ratio between 0% and 70%, and in increments of 5% between 70% and 100% (the vicinity of the maximum value).

(Color Prediction Base Grid Point Section)

Next, the color prediction base grid point section will be described. A "color prediction base grid point" is the vertex point of each grid square when the n-dimensional color space is divided into m square grid squares (where m is an integer no less than 1). If m=1, then this means that the color space is not divided.

The "color prediction base grid point section" is constituted by a group of patches in which the ideal halftone dot area ratio of each color at each of the vertex points is specified. As stated previously, the color prediction base grid point section does not include patches corresponding to halftone dot area ratios in a region which exceeds the provisional coloring material use limit value.

If each axis of the n-dimensional color space is divided into m parts, then there will be $n^{m+1}$ patches which are candidate patches for constituting the "color prediction base grid point section". $n \times (m+1)$ patches of these $n^{m+1}$ patch candidates are monochromatic patches (patches corresponding to grid points on each of the color axes), and the monochromatic patches can be included in the monochromatic multiple tone section described above.

The m+1 patches include m patches having an ideal halftone dot area ratio other than 0% and one patch having an ideal halftone dot area ratio of 0% for all of the coloring materials.

Consequently, the patches which constitute the "color prediction base grid point section" may be only patches of mixed colors (patches in which coloring materials of two or more colors are used). For example, the patches corresponding to nine vertex points labeled with reference numerals 16-1 to 16-9 in the two-dimensional color space shown in FIG. 3 are included in the patches which constitute the color prediction base grid point section.

According to this composition, it is possible to avoid duplication of monochromatic patches in the monochromatic multiple tone section and the color measurement base grid point section, thus contributing to reduction in the overall number of patches in the chart image.

By increasing the number of divisions of each color axis (the value of m described above), it is possible to further improve the prediction accuracy of the color measurement processing. On the other hand, by reducing the number of divisions of each axis, it is possible to further reduce the overall number of patches, and the color measurement step (step S16 in FIG. 1) can be further shortened. Ultimately, it is also possible to treat the whole region of the color space as one grid square, without dividing the respective color axes.

Here, the number of divisions of each axis is a common value of m, but it is also possible to set different values ($m_1$, $m_2$, . . . ) respectively for each axis. It is possible to improve the prediction accuracy for the colors of magenta and yellow that make up skin colors which are colors that are important in terms of psychological image quality, by making modifications such as increasing the number of divisions for important colors such as these.

(Extrapolation Calculation Learning Section)

Next, the extrapolation calculation learning section will be described. The extrapolation calculation learning section is a group of patches corresponding to learning data which is used to infer the colors of patches which are not output due to exceeding the coloring material use limit value (patches that cannot be output), in the color prediction base grid point section described above.

More specifically, the patches which constitute the extrapolation calculation learning section are a group of patches made up of a plurality of patches corresponding to color measurement values in a range not exceeding the coloring material use limit value, and mainly corresponding to the ideal halftone dot area ratios at the coloring material use limit value and ideal halftone dot area ratios in the vicinity of the coloring material use limit value.

In FIG. 3, the color measurement values corresponding to the ideal halftone dot area ratios at the coloring material use limit value are labeled with reference numeral 12, and the color measurement values corresponding to the ideal halftone dot area ratios in the vicinity of the coloring material use limit value are labeled with reference numeral 14. In the description given below, the color measurement values 12 corresponding to the ideal halftone dot area ratios at the coloring material use limit value and the color measurement values 14 corresponding to the ideal halftone dot area ratios in the vicinity of the coloring material use limit value may be referred to jointly as "extrapolation calculation learning data".

By increasing the number of patches in the extrapolation calculation learning section, it is possible to improve the inference accuracy of the processing for inferring patch colors that cannot be output (which is described in detail below). On the other hand, by reducing the number of patches in the extrapolation calculation learning section, it is possible to further reduce the overall number of patches, and the color measurement step (step S16 in FIG. 1) can be further shortened.

(Patch Group Output Step)

The second group of patches (chart image) including a monochromatic tone section, a color prediction base grid point section and an extrapolation calculation learning section, which is created by the patch group creating step described above is output depending on the combination of the image formation unit and the medium for which the output color characteristics are to be investigated (step S14 in FIG. 1).

(Color Measurement Step)

When the second group of patches is output to the medium, the patches included in the second group of patches are subjected to color measurement (step S16 in FIG. 1). Color measurement can employ a commonly known technique, for example, color measurement by a spectral photometer. The color measurement values according to this mode use XYZ values in a CIE-XYZ color system.

If a CIE-XYZ color system is used, then color characteristics can be expressed by a small number of dimensions and the processing calculation time can be shortened, compared to cases where data of a high number of dimensions is used, such as spectral reflectivity.

Of course, it is also possible to use high-dimensional data, such as spectral reflectivity. By using spectral reflectivity, it is possible to recalculate the color characteristics at a later time, if the observation light source has changed, for example, and it is possible to reproduce colors in a variety of environments.

(Output Color Predictor Generating Step)

Figure 4:
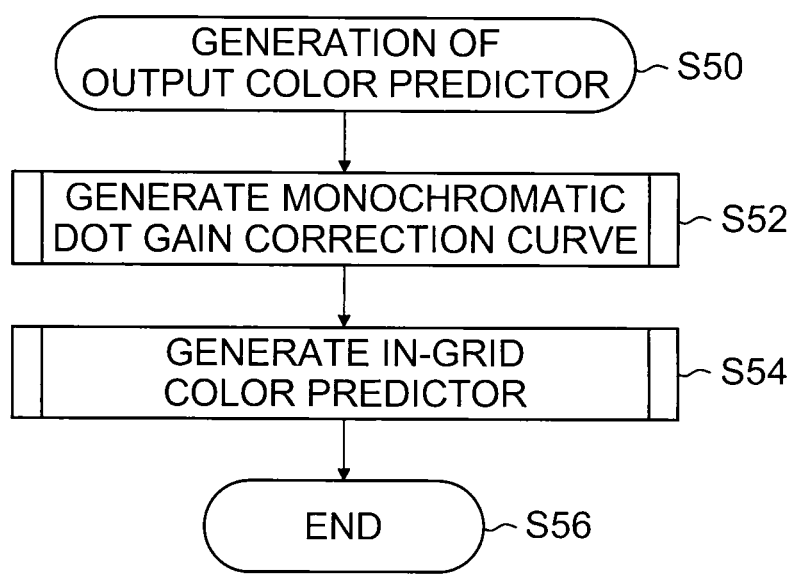
FIG. 4 is a flowchart showing details of the output color predictor generating process shown in FIG. 1.

Next, the output color predictor generating step (step S18 in FIG. 1) will be described. FIG. 4 is a flowchart showing details of the generation of an output color predictor. As shown in FIG. 4, the output color predictor generating step includes a monochromatic dot gain correction curve generating step (step S52) and an in-grid color predictor generating step (step S54).

This "output color predictor" is software (a program) which outputs predicted values for the color measurement values corresponding to any input color signal value, including the patches that cannot be output, in respect of the combination of the image formation unit and the medium for which the output color characteristics are to be investigated.

In the case of image formation based on four colors CMYK, "any input color signal value" could be taken as the ideal halftone dot area ratio for each color. One example of the color measurement value is an XYZ value in a CIE-XYZ color system.

Next, the respective steps which make up the output color predictor generating step will be described, in order of implementation.

(Monochromatic Dot Gain Correction Curve Generating Step)

The monochromatic dot gain correction curve generating step is a process for determining a conversion curve for converting a monochromatic ideal halftone dot area ratio into a monochromatic effective halftone dot area ratio.

Here, the "ideal halftone dot area ratio" is a signal value which is input to the image forming apparatus; for example, if the input signal value is defined as an 8-bit value from 0 to 255, then the halftone dot area ratio can be determined by normalization to a range between 0% and 100%, taking 0 to be 0% and 255 to be 100%. Furthermore, the "monochromatic ideal halftone dot area ratio" is the "ideal halftone dot area ratio" for each color.

Moreover, the "effective halftone dot area ratio" is a value obtained by converting a color measurement value x into an area ratio s by the Murray-Davis Equation which is shown in Formula (1) below, and the "monochromatic effective halftone dot area ratio" is a value of the effective halftone dot area ratio s for each color.

$$s=(x-x_0)/(x_{100}-x_0) \tag{1}$$

Here, x is a color measurement value and if using a CIE-XYZ color system, x is any one of an X value, a Y value and a Z value. If using the spectral reflectivity, x is the reflectivity at a particular wavelength.

$x_0$ is a color measurement value when the ideal halftone dot area ratio is 0%, and $x_{100}$ is a color measurement value when the ideal halftone dot area ratio is 100%.

It is known that, generally, there is a non-linear relationship between the monochromatic ideal halftone dot area ratio and the monochromatic effective halftone dot area ratio, and the non-linearity between the monochromatic ideal halftone dot area ratio and the monochromatic effective halftone dot area ratio causes the accuracy of the color measurement to decline. In this way, by carrying out monochromatic dot gain correction curve generation processing, the non-linearity of the monochromatic ideal halftone dot area ratio and the monochromatic effective halftone dot area ratio is corrected and can be made to approach linear characteristics, as a result of which it is possible to improve the accuracy of color prediction.

Figure 5:
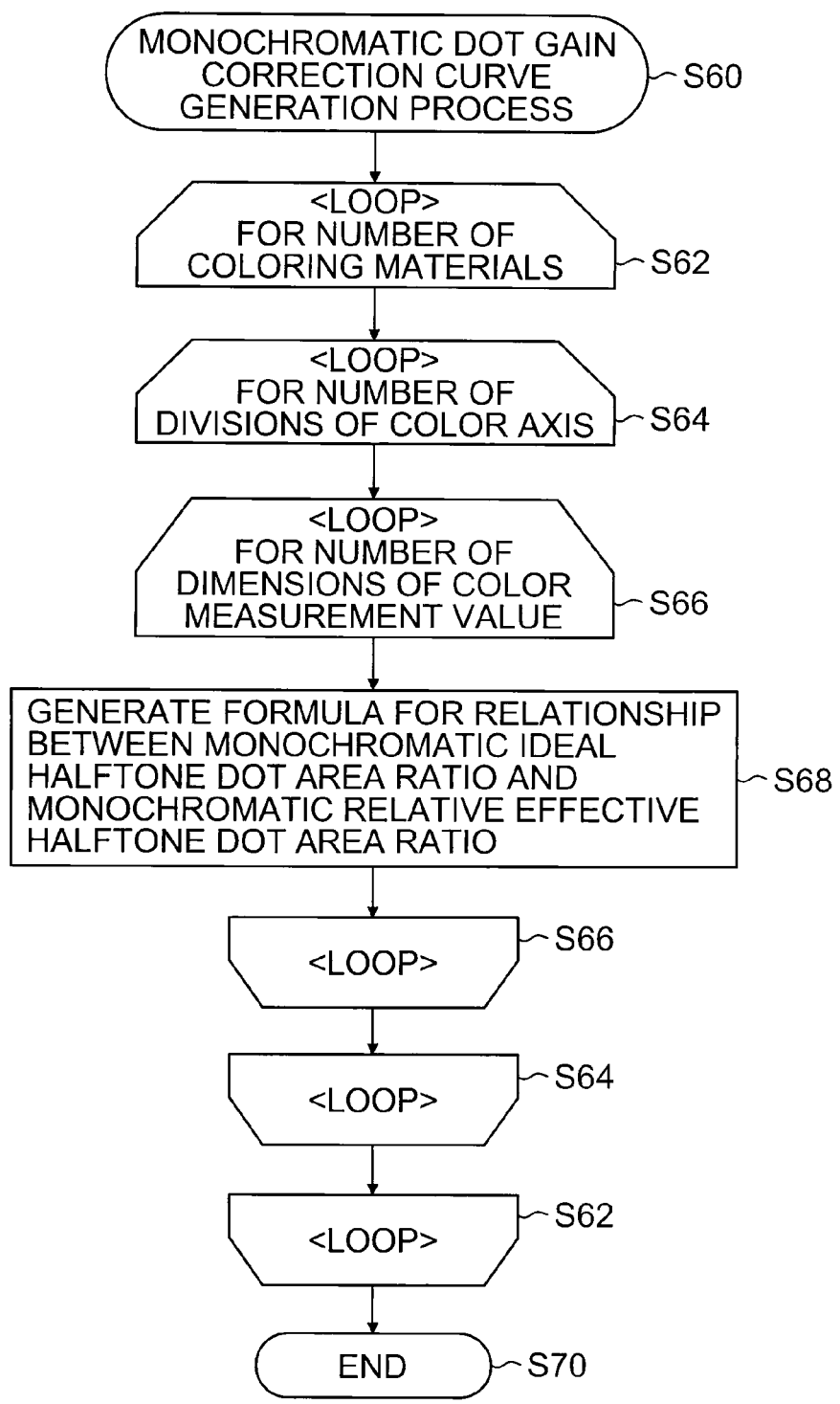
FIG. 5 is a flowchart showing details of a monochromatic dot gain correction curve generation process shown in FIG. 4.

FIG. 5 is flowchart showing a sequence of control in a monochromatic dot gain correction curve generating step. As shown in FIG. 5, when monochromatic dot gain correction curve generation is started (step S60), firstly, processing is looped in line with the number of coloring materials (step S62). In the case of image formation using four colors CMYK, the number of loops (number of coloring materials) is four.

Next, processing is looped in accordance with the number of divisions of the respective color axes (step S64). In the example shown in FIG. 3, the range is split into three parts by the four dividers at 0%, 30%, 70%, 100% (the three parts being no less than 0% and no more than 30%, more than 30% and no more than 70%, and more than 70% and no more than 100%). Therefore, the number of loops is three.

Next, processing is looped in accordance with the number of dimensions of the color measurement values (step S66). This means that a plurality of effective halftone dot area ratios are calculated in respect of one input value (ideal halftone dot area ratio). If a CIE-XYZ color system is used for the color measurement values, the number of loops is three.

By setting the effective halftone dot area ratio separately for each dimension of the color measurement value, it is possible to improve the final color prediction accuracy. Loop processing based on the number of dimensions of the color measurement values is not essential. If a CIE-XYZ color system is used for the color measurement values, then it is possible to calculate an effective halftone dot area ratio for the Y value only, and to then apply the effective halftone dot area ratio based on the Y value to the effective halftone dot area ratio based on the X value and the effective halftone dot area ratio based on the Z value.

In this way, by applying a common effective halftone dot area ratio for the effective halftone dot area ratio based on each dimension of the color measurement value, the processing is simplified, the software installation is made less complicated, and furthermore the processing time is shortened.

In the processing in each loop (step S68), the relationship between the monochromatic ideal halftone dot area ratio and the monochromatic effective halftone dot area ratio (relationship curve) is determined. Here, the "relative effective halftone dot area ratio" expresses the effective halftone dot area ratio determined by setting the start point of the ideal halftone dot area ratio in a divided cluster under processing to 0% and the end point of the ideal halftone dot area ratio to 100%.

If the start point of the ideal halftone dot area ratio in the divided cluster (divided region) is 30% and the end point of the ideal halftone dot area ratio is 70%, then the Murray-Davies Equation indicated by Formula (1) described above is re-read as indicated by Formula (2) below.

$$S=(x-x_{30})/(x_{70}-x_{30}) \quad (2)$$

$x_{30}$ is a color measurement value when the ideal halftone dot area ratio is 30%, and $x_{70}$ is a color measurement value when the ideal halftone dot area ratio is 70%.

In this way, by using a monochromatic relative effective halftone dot area ratio, it is possible to achieve monochromatic dot gain correction processing having high affinity with the loop processing of each grid square, in the in-grid color predictor generating step which is described next (step S54 in FIG. 4).

Next, a concrete example of the generation of a relationship curve between the monochromatic ideal halftone dot area ratio and the monochromatic relative effective halftone dot area ratio (the monochromatic dot gain correction curve) is explained.

The monochromatic relative effective halftone dot area ratio is calculated using Formula (2) described above, in respect of the monochromatic ideal halftone dot area ratios set in the monochromatic multiple tone section in the patch image creating step described previously (values in 10% increments for halftone dot area ratios from 0% to 70% and values in 5% increments for halftone dot area ratios from 70% to 100% in FIG. 3).

A curve which determines a monochromatic relative effective halftone dot area ratio from any monochromatic ideal halftone dot area ratio is generated by using the group of calculated data dots. For example, it is possible to generate the curve by interpolation from this group of data dots. In this way, by using interpolation, it is possible to generate a curve while preserving the fine non-linearity of the group of data dots, and color prediction accuracy in a system having high non-linearity can be improved.

Here, a commonly known technique, such as linear interpolation, spline interpolation, Hermite interpolation, or the like, can be used for interpolation.

On the other hand, the curve for determining a monochromatic relative effective halftone dot area ratio from any monochromatic ideal halftone dot area ratio may be generated by fitting to an approximate curve, by using polynomial approximation, or the like, from the group of data dots. By using curve approximation in this way, it is possible to generate a highly robust curve which is not liable to be affected by noise components included in the data group.

In the present invention, dot gain correction curves are generated respectively for each grid square, but it is also possible to generate one dot gain correction curve for the whole color space (or if creating curves for each of the XYZ axes, then three dot gain correction curves), and to then determine an effective halftone dot area ratio that is not relative and to subsequently convert it into a relative effective halftone dot area ratio. In a method of this kind, a beneficial effect is obtained in preventing the occurrence of unnatural discontinuities at the borders of the grid points.

(In-Grid Predictor Generating Step)

Next, an in-grid color predictor generating step shown in step S54 in FIG. 4 will be described in detail. The "in-grid color predictor" is software which predicts the color measurement values of vertex points that have an unknown color measurement value, of the vertex points of the respective grid squares obtained by dividing the multi-dimensional color space into a plurality of grid squares.

The color measurement value (color signal value) corresponding to any particular input signal value (combination of ideal halftone dot area ratios) can be predicted by using the color measurement values of the vertex points of the grid square to which that color signal value belongs, in the multi-dimensional color space which is created by the respective color axes (see Formulas (3) and (5)).

Here, the grid squares in the multi-dimensional space are partial finite spaces which are demarcated by the color signal values of the color prediction base grid point section of the first group of patches which was created by the patch image creating step shown in step S12 in FIG. 1 (these signal values also include color signal values of patches that cannot be output). For example, one grid square is the region enclosed by the grid points 16-1, 16-2, 16-3, 16-4 in the two-dimensional (CM) color space shown in FIG. 3.

In the in-grid color predictor generating step, out of the vertex points of all of the grid squares in the multi-dimensional color space, the color measurement values of those vertex points which have a color measurement value corresponding to an input signal value of a patch that cannot be output (a color measurement value in a region exceeding the coloring material use limit value 10 shown in FIG. 3), (in other words, those vertex points having an unknown color measurement value) are inferred.

The in-grid color predictor generating step in a two-dimensional color space as shown in FIG. 3 is described in detail below. As stated previously, the two-dimensional color space shown in FIG. 3 has a cyan color axis and a magenta color axis, the maximum coloring material use value is 200% (100% per color×2 colors), and the coloring material limit value indicated by the dotted line labeled with reference numeral 10 is 130%.

In the in-grid color predictor generating step, the color measurement values at the color prediction base grid points labeled with reference numerals 16-1 to 16-9 in FIG. 3 (the vertex points having unknown color measurement values) are inferred.

Figure 6:
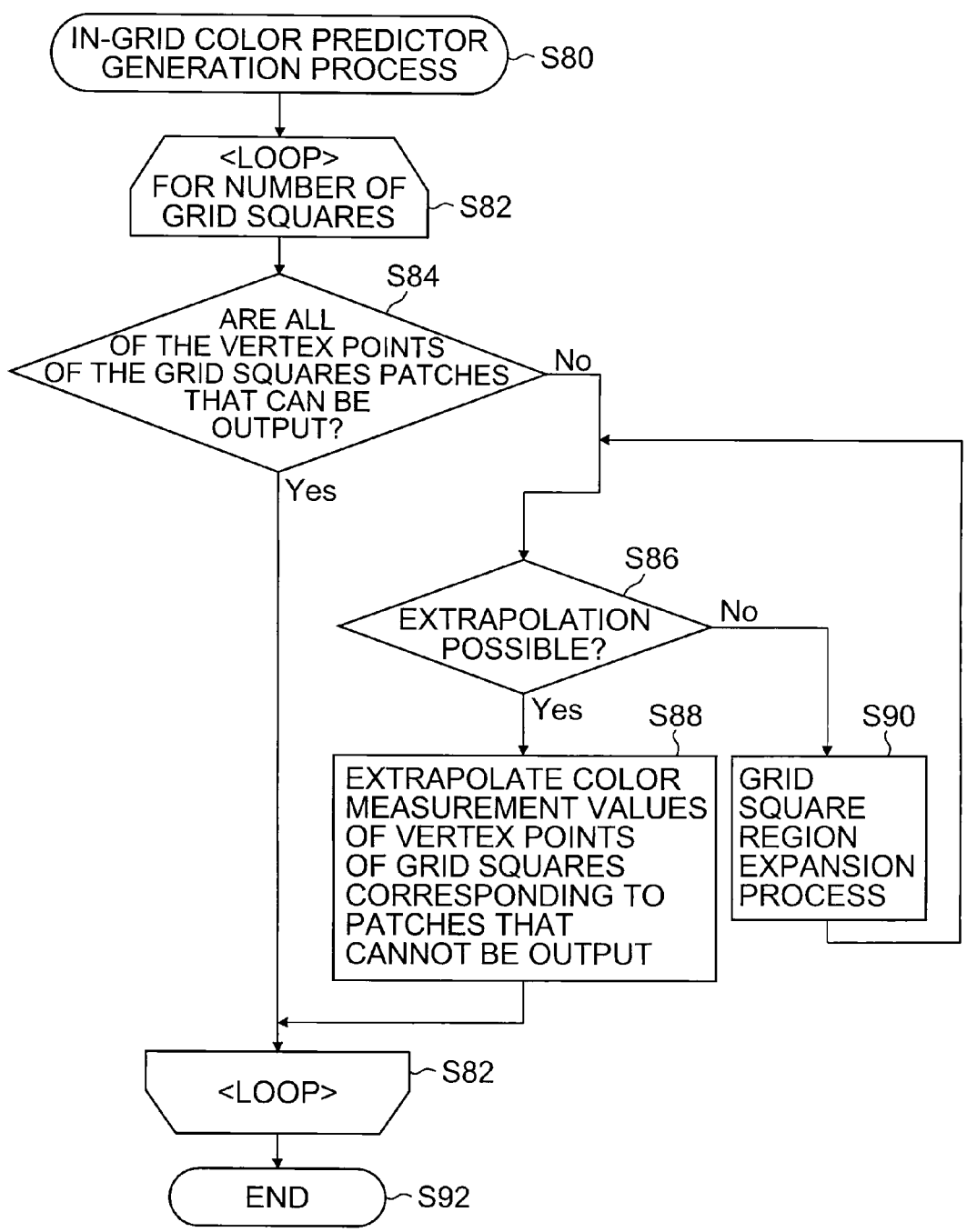
FIG. 6 is a flowchart showing details of an in-grid color predictor generating process shown in FIG. 4.

FIG. 6 is flowchart showing a sequence of control in the in-grid color predictor generating step. In the in-grid color predictor generating step, since processing is carried out for each grid square, then the processing is looped in accordance with the number of grid squares (step S82). The two-dimensional color space shown in FIG. 3 is divided into nine grid squares (18-1 to 18-9), and therefore the number of loops is 9.

Furthermore, in the in-grid color predictor generating step, processing is carried out in sequence from the grid square nearest to the point of origin. In the color space shown in FIG. 3, processing is carried out in the sequence of grid square 18-1, grid square 18-2, grid square 18-3, ..., grid square 18-8 and grid square 18-9.

In step S84 in FIG. 6, it is determined whether or not all of the vertex points of the grid square under processing are patches that can be output (whether or not they are vertex points having known color measurement values). In step S84, if all of the vertex points of the grid square under processing are patches that can be output (Yes verdict), then the loop for that grid square is terminated.

In the two-dimensional color space shown in FIG. 3, in the grid squares 18-1, 18-2, 18-3, 18-4 and 18-6, all of the vertex points correspond to patches that can be output.

On the other hand, if there are vertex points corresponding to patches that cannot be output in the grid square under processing in step S84 (No verdict), then it is determined whether or not the grid square under processing can be calculated by extrapolation (step S86). In the two-dimensional color space shown in FIG. 3, the grid squares 18-5, 18-7, 18-8 and 18-9 have vertex points corresponding to patches that can be output.

Here, "calculation by extrapolation" means calculation to calculate a color measurement value of a vertex point corresponding to a patch that cannot be output, in the grid square under processing, by using extrapolation calculation learning data belonging to the grid square under processing (this process is described in detail below).

In step S86, if the grid square under processing has extrapolation calculation learning data and it is determined that the grid square under processing can be calculated by extrapolation (Yes verdict), then the procedure advances to step S88, and an extrapolation calculation is carried out. On the other hand, if, at step S86, the grid square under processing does not have extrapolation calculation learning data and it is determined that the grid square under processing is a grid square which cannot be calculated by extrapolation (No verdict), then a grid square region expansion process (details described below) is carried out (step S90), the procedure returns to step S86, and it is then determined whether or not the grid square under processing having an expanded region can be calculated by extrapolation.

More specifically, if the grid square under processing is a grid square for which an extrapolation calculation cannot be carried out, then the region of the grid square under processing is expanded until an extrapolation calculation can be carried out, and color measurement values are calculated for the vertex points corresponding to patches that cannot be output in the grid square under processing.

When color measurement values have been calculated for the vertex points corresponding to patches that cannot be output, in all of the grid squares, then the in-grid color predictor generating step terminates (step S92).

<Concrete Example of Extrapolation Calculation>

Figure 7:
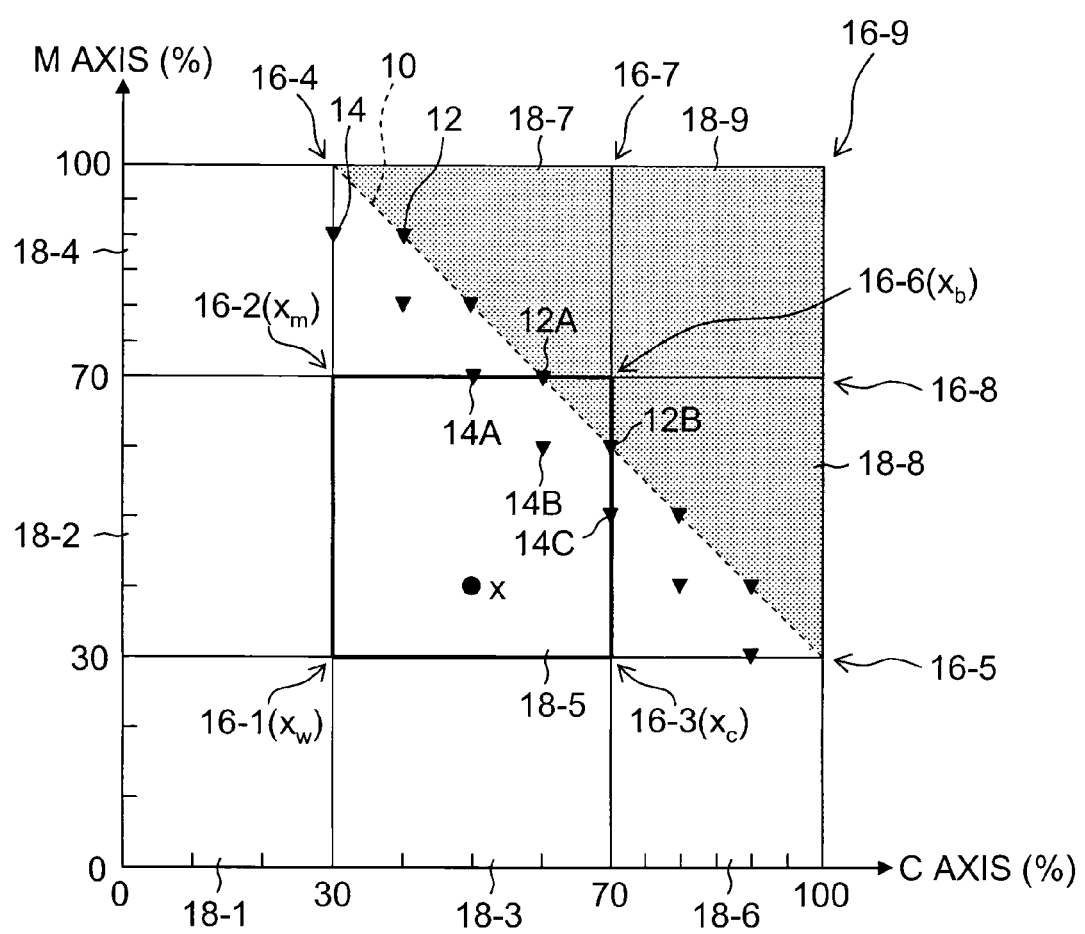
FIG. 7 is an illustrative diagram of an extrapolation calculation in the in-grid color predictor generating process shown in FIG. 6.

Next, a concrete example of an extrapolation calculation as shown in step S88 of FIG. 6 is described with reference to the two-dimensional color space shown in FIG. 3. FIG. 7 is an illustrative diagram of an extrapolation calculation. The color space shown in FIG. 7 is the same as the two-dimensional space shown in FIG. 3, and in FIG. 7, parts which are the same as or similar to FIG. 3 are labeled with the same reference numerals and description thereof is omitted.

The grid square 18-5 (indicated by the thick lines) in the two-dimensional color space shown in FIG. 7 includes a vertex point 16-6 which corresponds to a patch that cannot be output. The color measurement value x at any point in the grid square 18-5 is expressed by Formula (3) below, using the color measurement value $x_w$ of vertex point 16-1, the color measurement value $x_m$ of vertex point 16-2, the color measurement value $x_c$ of vertex point 16-3 and the color measurement value $x_b$ of vertex point 16-4.

$$x = a_w \times x_w + a_m \times x_m + a_c \times x_c + a_b \times x_b \quad (3)$$

Here, the values $a_w$, $a_m$, $a_c$, $a_b$ are polychromatic relative effective halftone dot area ratios, which are calculated by using Demichel equations (Formula 4-1 to Formula 4-4).

$$a_w = (1-s_c) \times (1-s_m) \quad (4\text{-}1)$$

$$a_m = s_c \times (1-s_m) \quad (4\text{-}2)$$

$$a_c = (1-s_c) \times s_m \quad (4\text{-}3)$$

$$a_b = s_c \times s_m \quad (4\text{-}4)$$

$s_c$ is a monochromatic relative effective halftone dot area ratio for a cyan axis coordinate at the prediction point of the color measurement value x, and $s_m$ is a relative effective halftone dot area ratio for a magenta axis coordinate at the prediction point of the color measurement value x. $s_c$ and $s_m$ are respectively calculated by using the monochromatic dot gain correction curve described above, from the cyan axis coordinate value and the magenta axis coordinate value.

In grid square 18-5, vertex point 16-6 corresponds to a patch that cannot be output, and therefore the color measurement value of this point is unknown, but since the grid square 18-5 includes extrapolation calculation learning data 12A, 12B, 14A, 14B and 14C, then the color measurement value of the vertex point 16-6 can be calculated by substituting these values into Formula (3) above.

In the example shown in FIG. 7, five extrapolation calculation learning data (known color measurement values) 12A, 12B, 14A, 14B, 14C are included in the grid square 18-5, and therefore it is possible to establish five equations with respect to one unknown number. Therefore, this becomes a "well-posed problem" in which the number of equations is greater than the unknown numbers, and therefore it is possible to infer the value of $x_b$ which produces the smallest difference by a least-squares method.

In other words, in the patch image creating step shown in FIG. 1, a second group of patches is created in such a manner that the extrapolation calculation learning section includes a greater number of patches than the number of vertex points corresponding to patches that cannot be output (vertex points having unknown color measurement values), and therefore the color measurement values of the vertex points corresponding to patches that cannot be output can be calculated by using a method such as the least-squares method, using Formula (3) described above. By registering a greater number of patches in the extrapolation calculation learning section, it is possible to increase the accuracy of inference of the color measurement values described above.

The grid square 18-7 and the grid square 18-8 shown in FIG. 7 include a number of known color measurement values (five) which exceeds the number of vertex points having an unknown color measurement value (one), and therefore the color measurement value of the vertex point 16-7 of the grid square 18-7 and the color measurement value of the vertex point 16-8 of the grid square 18-8 can be inferred by a least-squares method using Formula (3) stated above, similarly to the vertex point 16-6 of the grid square 18-5 described above.

A desirable mode is one in which the patches of the extrapolation calculation learning section are created in such a manner that the extrapolation calculation learning data 12 is arranged equidistantly on the line representing the coloring material use limit value. Furthermore, a desirable mode is one in which the patches of the extrapolation calculation learning section are created in such a manner that the extrapolation calculation learning data 14 is arranged at positions corresponding to variation in the coloring material use limit value.

According to this mode, since there is extrapolation calculation learning data 14 which includes known color measurement values, within the range of variation of the coloring material use limit value, then the accuracy of inference of color measurement values within the range of variation of the coloring material use limit value is improved.

<Grid Square Region Expansion Process>

Figure 8:
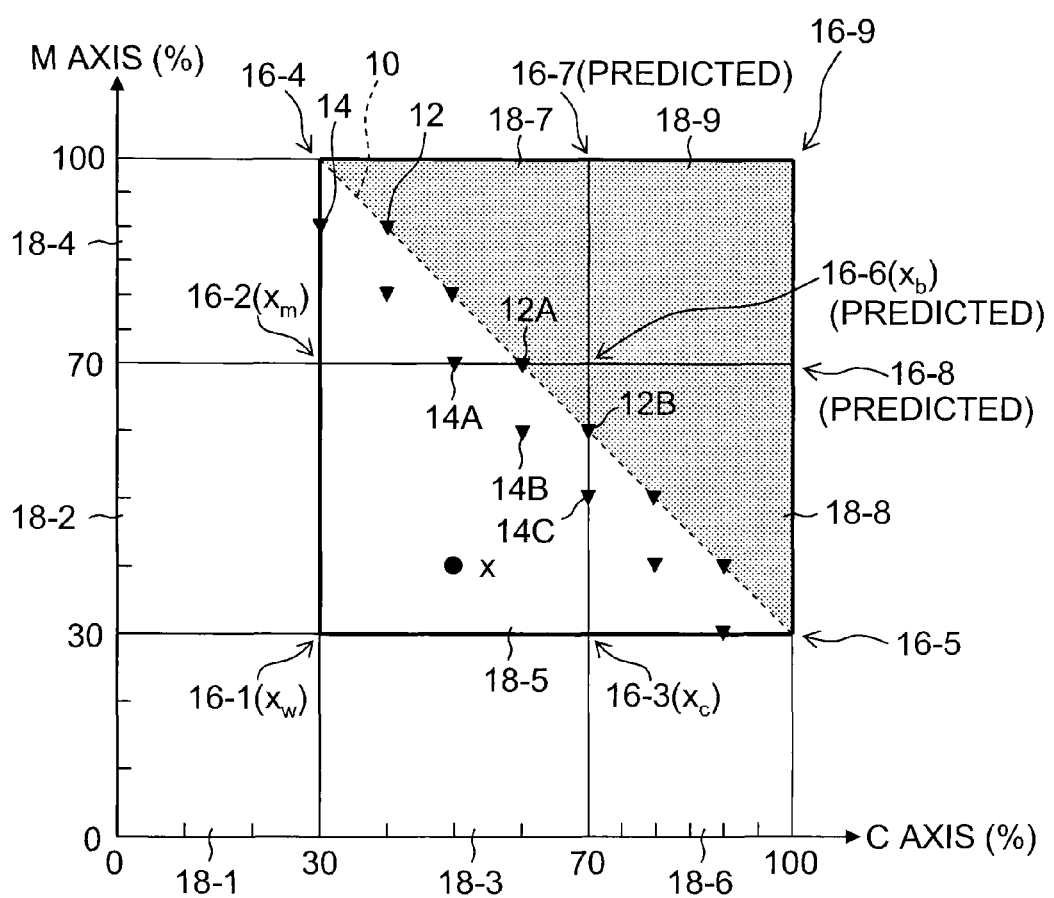
FIG. 8 is an illustrative diagram of a region expansion process in the in-grid color predictor generating process shown in FIG. 6.

Next, a grid square region expansion process as shown in step S90 of FIG. 6 is described with reference to the two-dimensional color space shown in FIG. 3. FIG. 8 is an illustrative diagram of a grid square region expansion process in the two-dimensional color space shown in FIG. 3. In FIG. 8, parts which are the same as or similar to FIG. 3 and FIG. 7 are labeled with the same reference numerals and further explanation thereof is omitted here.

In the two-dimensional color space shown in FIG. 8, the grid square 18-9 includes the vertex points 16-6, 16-7 and 16-8 for which color measurement values have been determined by an extrapolation calculation, and also includes a vertex point 16-9 having an unknown color measurement value.

Furthermore, the grid square 18-9 does not include extrapolation calculation learning data 12, 14, and therefore an equation for determining the unknown color measurement value cannot be established by substituting the unknown color measurement value for x in Formula (3) described above.

In other words, this results in an ill-posed problem having one unknown number and zero equations, and in this state, the color measurement value of the vertex 16-9 cannot be inferred. In this case, the region of the grid square under processing is expanded by linking together adjacent grid squares so as to include the extrapolation calculation learning data 12, 14.

In the example shown in FIG. 8, the grid square 18-10 (indicated by the thick lines), in which the grid squares 18-5, 18-6 and 18-7 are linked to the grid square 18-9 is set as the grid square that is the object of processing.

This expanded grid square 18-10 includes six extrapolation calculation learning data 12 and seven extrapolation calculation learning data 14, and therefore a well-posed problems results and the color measurement value of the vertex point 16-9 can be inferred.

More specifically, by repeating the grid square expansion process until the color measurement value inference problem becomes a well-posed problem, it is possible to infer the color measurement value of a vertex point having an unknown color measurement value, by an extrapolation calculation. The patches corresponding to the extrapolation calculation learning data 12 and the extrapolation calculation learning data 14 should be created by taking account of the grid square region expansion process.

Figure 9:
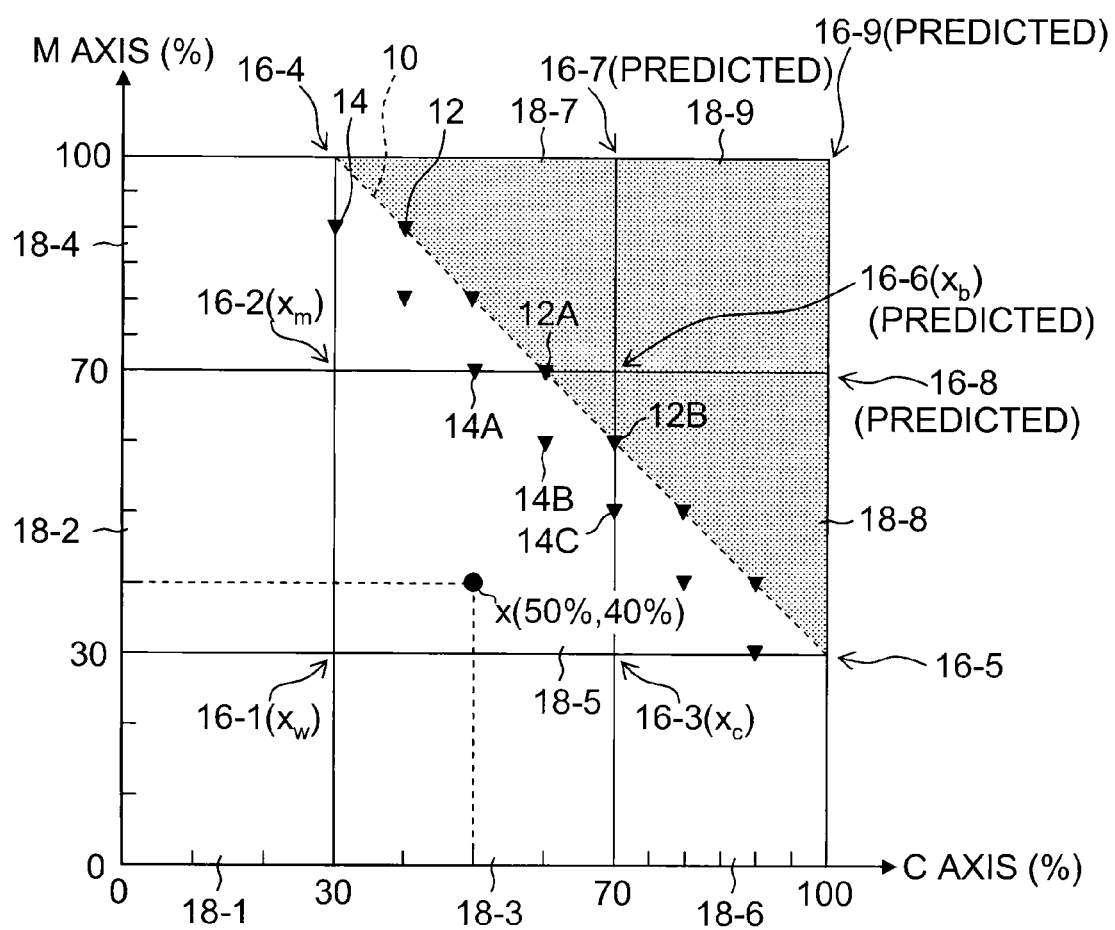
FIG. 9 is an illustrative diagram showing a two-dimensional color space after generation of an in-grid color predictor.

FIG. 9 is an illustrative diagram showing the two-dimensional color space shown in FIG. 3, or the like, after the in-grid color predictor has been generated. As shown in FIG. 9, when the color measurement values of the vertex points of the grid squares in the whole region of the two-dimension color space have been inferred, it is possible to predict color measurement values relating to input signal values, in the region exceeding the coloring material use limit value as well.

The two-dimensional color space described above can be generalized in relation to a multi-dimensional color space. For example, in image formation using four colors CMYK (a four-dimensional color space), Formula (3) above is expressed as shown in Formula (5) below.

$$x = a_w \times x_w + a_c \times x_c + a_m \times x_m + a_y \times x_y + a_k \times x_k + a_{cm} \times x_{cm} + \\ a_{cy} \times x_{cy} + a_{ck} \times x_{ck} + a_{my} \times x_{my} + a_{mk} \times x_{mk} + a_{yk} \times x_{yk} + \\ a_{cmy} \times x_{cmy} + a_{cyk} \times x_{cyk} + a_{myk} \times x_{myk} + a_{cmyk} \times x_{cmyk} \quad (5)$$

Furthermore, in image formation using four colors of CMYK, Formulas (4-1) to (4-4) described above are expressed by Formulas (6-1) to (6-16) below.

$$a_w = (1-s_c) \times (1-s_m) \times (1-s_y) \times (1-s_k) \quad (6\text{-}1)$$

$$a_c = s_c \times (1-s_m) \times (1-s_y) \times (1-s_k) \quad (6\text{-}2)$$

$$a_m = (1-s_c) \times s_m \times (1-s_y) \times (1-s_k) \quad (6\text{-}3)$$

$$a_y = (1-s_c) \times (1-s_m) \times s_y \times (1-s_k) \quad (6\text{-}4)$$

$$a_k = (1-s_c) \times (1-s_m) \times (1-s_y) \times s_k \quad (6\text{-}5)$$

$$a_{cm} = s_c \times s_m \times (1-s_y) \times (1-s_k) \quad (6\text{-}6)$$

$$a_{cy} = s_c \times (1-s_m) \times s_y \times (1-s_k) \quad (6\text{-}7)$$

$$a_{ck} = s_c \times (1-s_m) \times (1-s_y) \times s_k \quad (6\text{-}8)$$

$$a_{my} = (1-s_c) \times s_m \times s_y \times (1-s_k) \quad (6\text{-}9)$$

$$a_{mk} = (1-s_c) \times s_m \times (1-s_y) \times s_k \quad (6\text{-}10)$$

$$a_{yk} = (1-s_c) \times (1-s_m) \times s_y \times s_k \quad (6\text{-}11)$$

$$a_{cmy} = s_c \times s_m \times s_y \times (1-s_k) \quad (6\text{-}12)$$

$$a_{cmk} = s_c \times s_m \times (1-s_y) \times s_k \quad (6\text{-}13)$$

$$a_{cyk} = s_c \times (1-s_m) \times s_y \times s_k \quad (6\text{-}14)$$

$$a_{myk} = (1-s_c) \times s_m \times s_y \times s_k \quad (6\text{-}15)$$

$$a_{cmyk} = s_c \times s_m \times s_y \times s_k \quad (6\text{-}16)$$

In other words, in image formation using the four colors CMYK, there are 16 vertex points, and color measurement values can be inferred by using Formula (5) and Formula (6-1) to Formula (6-16) described above.

(Color Conversion LUT Creating Step)

In step S18 in FIG. 1, when the output color predictor is generated, a color conversion relationship in the multi-dimensional color space is determined by using the output color predictor. In other words, it is possible to create a color conversion LUT which converts any input signal value to an output color (color value) by using the output color predictor.

Below, the color conversion LUT creating step shown in step S20 in FIG. 1 will be described in detail.

In the field of printing, when carrying out color matching by CMS (Color Management System) processing, a so-called A2B table is created in order to temporarily convert device-dependent colors, which are color signal values that are dependent on the apparatus, into device-independent colors, which are color signal values that are not dependent on the apparatus.

The color measurement values predicted by using the output color predictor generated in step S18 in FIG. 1 are all device-independent colors, and therefore the output color predictor can be used in the CMS processing.

On the other hand, if the color measurement values for each pixel in the image data input to the printing apparatus (image forming apparatus) are predicted one pixel at a time in the output color predictor, then the data processing time becomes long. Furthermore, a raster image processor (RIP) device which carries out CMS processing often uses an international color consortium (ICC) profile, which is a unified standard for color conversion, and therefore it is practical to separately prepare a color conversion LUT for use in color conversion processing and to incorporate this LUT into the ICC profile.

Therefore, in the color conversion LUT creating step described in the present embodiment, a color conversion LUT (A2B table) is created. The "A2B table" is an LUT for converting a device-dependent color space (for example, CMYK values) into a device-independent color space (for example, CIE-XYZ values or L*a*b* values) and in this table, the multi-dimensional device-dependent color space is divided into discrete grid squares and color measurement values of the prediction points (LUT grid points) are stored.

(Creation of A2B Table)

Figure 10:
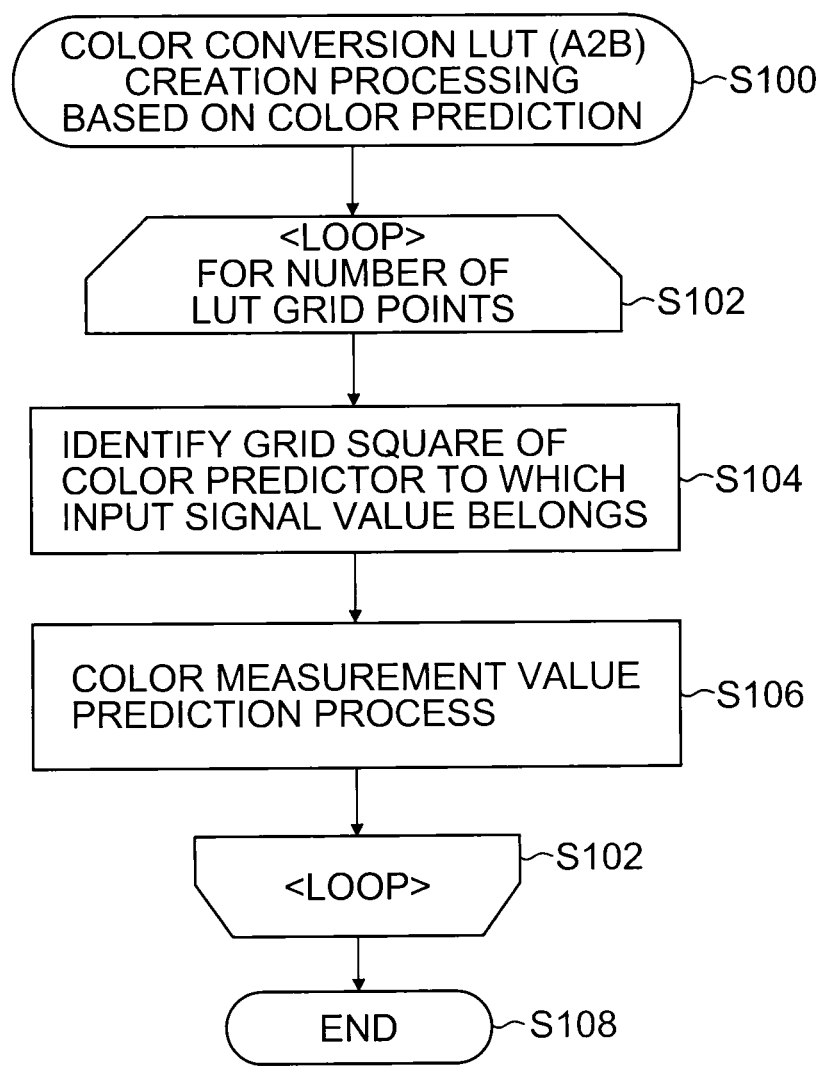
FIG. 10 is a flowchart showing details of a color conversion LUT (A2B) creation process shown in FIG. 1.
Figure 11:
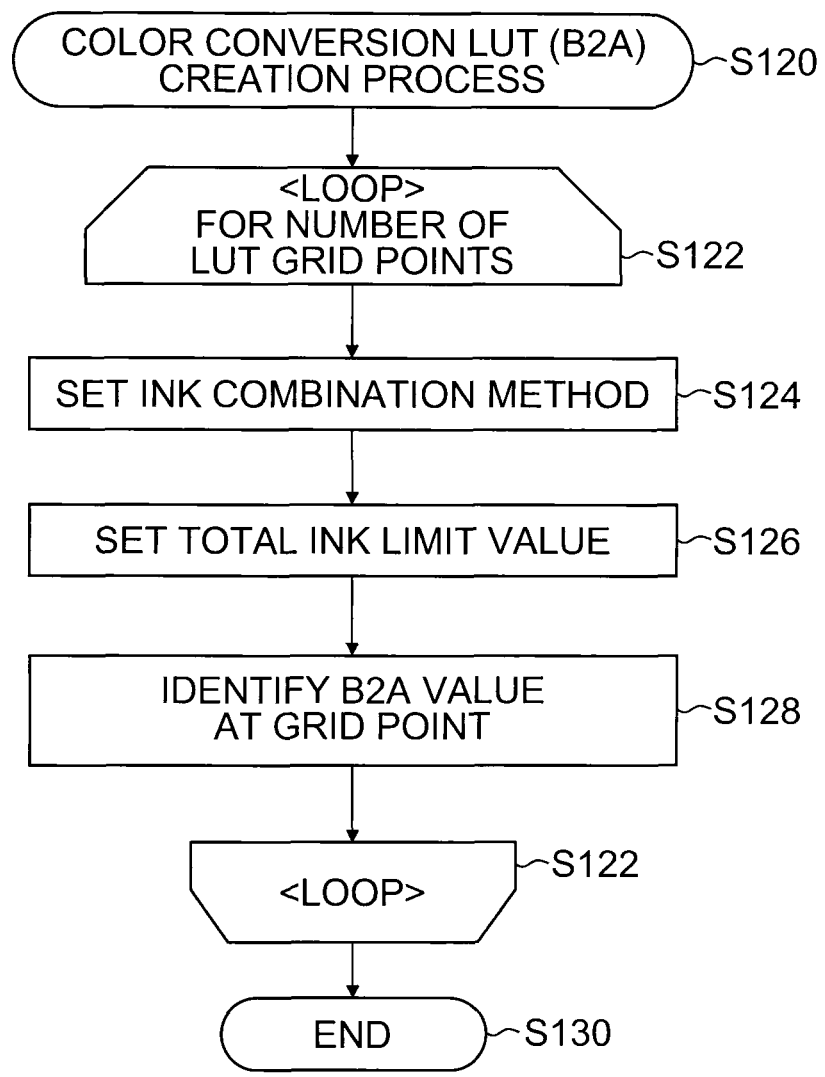
FIG. 11 is a flowchart showing details of a color conversion LUT (B2A) creation process shown in FIG. 1.

FIG. 10 is a flowchart showing a flow of processing for creating a color conversion LUT (A2B table) using an output color predictor. The creation of an A2B table described below is repeated for each LUT grid point (step S102). Firstly, a grid square in the output color predictor to which the color signal value of the LUT grid point (for example, a CMYK value) belongs (step S104), is identified.

For example, in CM two-color printing (the two-dimensional color space shown in FIG. 9), if the input color signal value is (C, M)=(50%, 40%), then the grid square 18-5 is identified. Next, a color measurement value is predicted using Formula (3) above, from the color measurement values ($x_w$, $x_m$, $x_c$, $x_b$) of the vertex points 16-1, 16-2, 16-3, 16-4 of the grid square 18-5 in the selected output color predictor, and the polychromatic relative effective halftone dot area ratio described previously, which is calculated from the input color signal value (step S106), and this predicted color measurement value is employed in the LUT.

It is possible to create a color conversion LUT by the processing described above. Since the output color predictor can predict any input color signal value (device-dependent color) including a region which exceeds the coloring material use limit, then it is possible to create an LUT in the whole region of the device-dependent color space, for the A2B table also.

(Creation of B2A Table)

In CMS processing, apart from the A2B table which is used to convert from a device-dependent color space to a device-independent color space, a B2A table which is a mirror image of the A2B table, in other words, which converts from a device-independent color space to a device-dependent color space is also required.

In the color conversion LUT creating step described in the present embodiment, a B2A table is created. The description given here relates to an example where four signal values for CMYK are used in the device-dependent color space and where CIE-XYZ values are used in the device-independent color space.

The creation of an B2A table is repeated for each LUT grid point (step S102). The A2B table described previously is able to define one combination of XYZ values for one combination of CMYK values, but in the B2A table, for instance, if it is possible to represent gray scale colors using K ink, then these colors can also be represented by using process black and a combination of CMY inks, and therefore it is necessary to establish the method of combining the used inks in advance (step S124).

Since it is possible to use commonly known technology for the method of combining the inks used, detailed described thereof is not given here.

Next, if there is a limit on the total amount of coloring material which can be used, as in the case of image formation by an inkjet method or image formation by an electrophotographic method, then it is necessary to set a limit value in this respect (step S126). A B2A table is created by dividing the CIE-XYZ color space into grid squares using a previously established limit value (restricting condition), and identifying a CMYK value which represents the relevant color, for each grid point of the LUT (step S128).

The coloring material use value described previously may be set as the limit value for the total amount of ink, for example, but in the present embodiment, colors in the whole region of the CMYK space of the A2B table are determined, and therefore it is possible to set any value as the limit value for the total amount of ink.

For example, it is possible to set a physical amount of ink (for example, an ink volume), rather than a monochromatic ideal halftone dot area ratio (%), and flexible processing can be adopted in which, if it is recognized that an amount of coloring material exceeding the coloring material use limit can be used, then the B2A table is subsequently recreated by making a fine adjustment to the limit value of the total amount of ink.

The "recreation of the B2A table" described here simply means performing recalculation in a computer, and does not in any way require time-consuming steps, such as creating and outputting charts again and measuring the charts again.

According to the color prediction method which is composed as described above, even in cases where ambiguities remain because an accurate coloring material use limit cannot be identified in advance for a combination of an image forming apparatus and a recording medium for which there is a limit on the total amount of coloring material used, a provisional coloring material use limit is set artificially, an output color predictor can be generated, and colors can be predicted (converted) for any input signal value, including input signal values which exceed the provisional coloring material use limit.

Furthermore, even in cases where it is identified that the actual coloring material use limit is greater than the provisional coloring material use limit, it is possible to create a color conversion table for the actual coloring material use limit by calculation only, using the output color predictor that has been generated already, without having to create, output and measure a chart again, or recreate the LUT.

For example, even in cases where the actual coloring material use limit has varied, for instance, when using a thicker recording medium, it is possible to create a color conversion table for the new coloring material use limit, by calculation only, using the existing output color predictor.

Moreover, it is possible to set any limit value for the total amount of ink as a search condition when creating the B2A table, which is used to convert from a device-independent color space to a device-dependent color space.

It is possible to create a program which causes a computer to execute the respective steps of the color prediction method described above. More specifically, it is possible to execute the respective steps of the color prediction method, by storing a program on a prescribed storage medium and reading the program stored on the storage medium into a computer.

(Example of Application to Color Prediction System)

Figure 12:
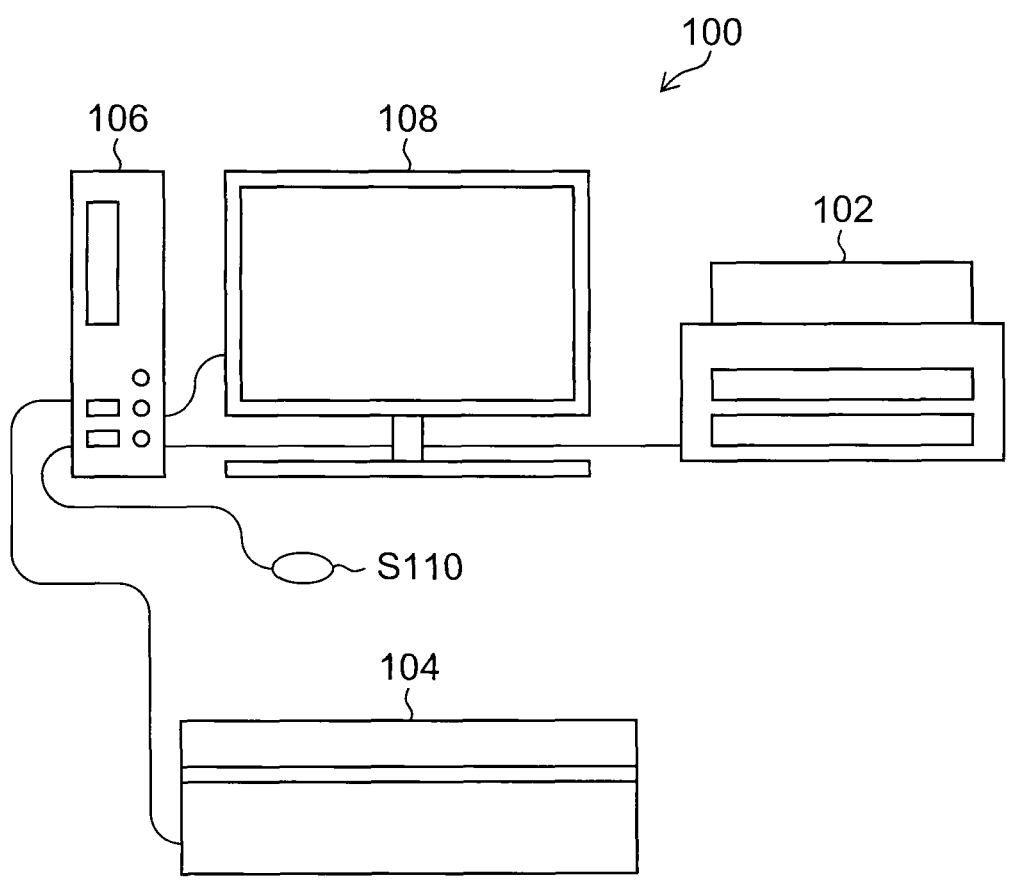
FIG. 12 is a general schematic drawing showing a schematic composition of a color prediction system to which the color prediction method according to the present embodiment is applied.

Next, a color prediction system in which the color prediction method relating to an embodiment of the present invention is applied will be described. FIG. 12 is a general schematic drawing of a color prediction system relating to an embodiment of the present invention.

The color prediction system 100 shown in FIG. 12 is constituted by: an inkjet recording apparatus 102 which output a group of patches (chart image); a spectral photometer 104 which performs color measurement of a group of patches output by the inkjet recording apparatus 102; an image processing apparatus 106 which acquires color measurement information obtained by the spectral photometer 104, generates an output color predictor, creates a color prediction (color conversion) LUT, and stores this color prediction LUT in a prescribed storage apparatus; a touch panel type monitor apparatus 108 which functions as an output apparatus and an input apparatus for the image processing apparatus 106; and a mouse 110 which functions as an input apparatus of the image processing apparatus 106.

The respective units of the color prediction system 100 shown in FIG. 12 are connected by data communication cables. It is also possible to use a wireless format for data communications.

The image processing apparatus 106 includes a storage apparatus in which the color prediction LUT is stored. It is also possible to provide a storage apparatus in which the color prediction LUT is stored, separately from the storage apparatus incorporated into the image processing apparatus 106.

The image processing apparatus 106 may function as a processing unit for carrying out color prediction processing (color conversion processing) while referring to a color prediction LUT, in respect of any input signal value, and may function as a processing unit which executes respective steps for creating a color prediction LUT and carries out color prediction processing by using calculation, or the like, on any input signal value, without referring to a color prediction LUT.

Figure 13:
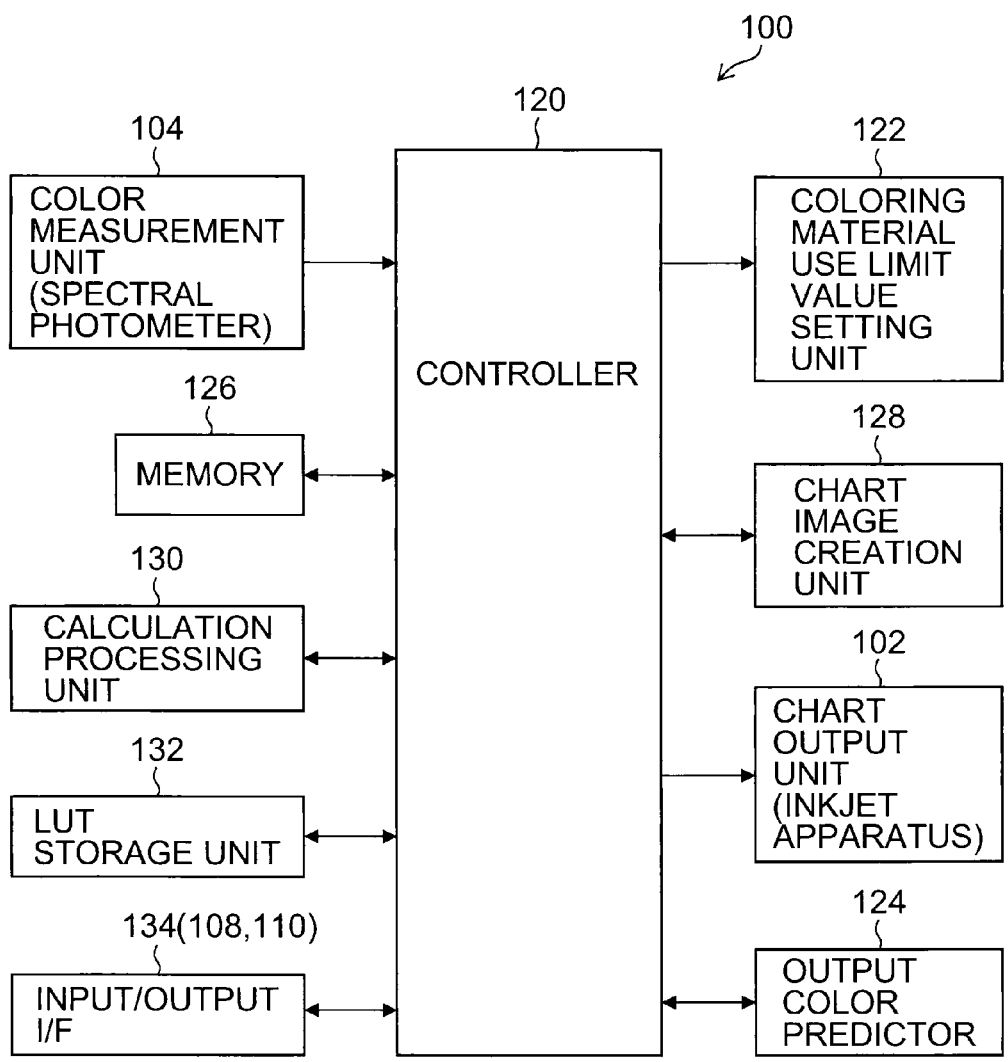
FIG. 13 is a block diagram showing a schematic composition of the color prediction system shown in FIG. 12.

FIG. 13 is a block diagram of the color prediction system shown in FIG. 12. As shown in FIG. 13, each unit of the color prediction system 100 is controlled universally by the control unit 120.

The coloring material use limit setting unit 122 sets a provisional coloring material use limit for generating an output color predictor 124. This set value is stored in a prescribed storage unit (for example, the memory 126 shown in FIG. 13).

A chart image creation unit 128 refers to the provisional coloring material use limit which has been stored previously and creates a chart image to be output from the inkjet recording apparatus 102, which functions as a chart image output unit.

A calculation processing unit 130 generates an output color predictor 124 on the basis of color measurement results from the spectral photometer 104 which functions as a color measurement unit, and also uses this output color predictor 124 to generate a color prediction (color conversion) LUT. The color prediction (color conversion) LUT is stored in an LUT storage unit 132.

An input/output interface (input/output I/F) 134 includes the touch panel type monitor apparatus 108 and the mouse 110 shown in FIG. 2. The input/output interface 134 may also include other generic interfaces, such as Universal Serial Bus (USB).

(Example of Application to Image Processing System)

The color prediction method shown in the present embodiment may be executed as one part of image processing in an inkjet recording apparatus (image forming apparatus). For example, a color prediction LUT created by the color prediction method may be read into an inkjet recording apparatus as part of the maintenance of the apparatus.

For example, if an inkjet head has been changed or an image formation engine has been changed, then it is possible to carry out the creation (updating) of a color conversion LUT, in the inkjet recording apparatus, on the basis of color measurement results obtained by creating a chart image and outputting the chart image. Furthermore, it is also possible to execute color conversion processing as part of image processing inside the inkjet recording apparatus.

(General Composition of Inkjet Recording Apparatus)

Figure 14:
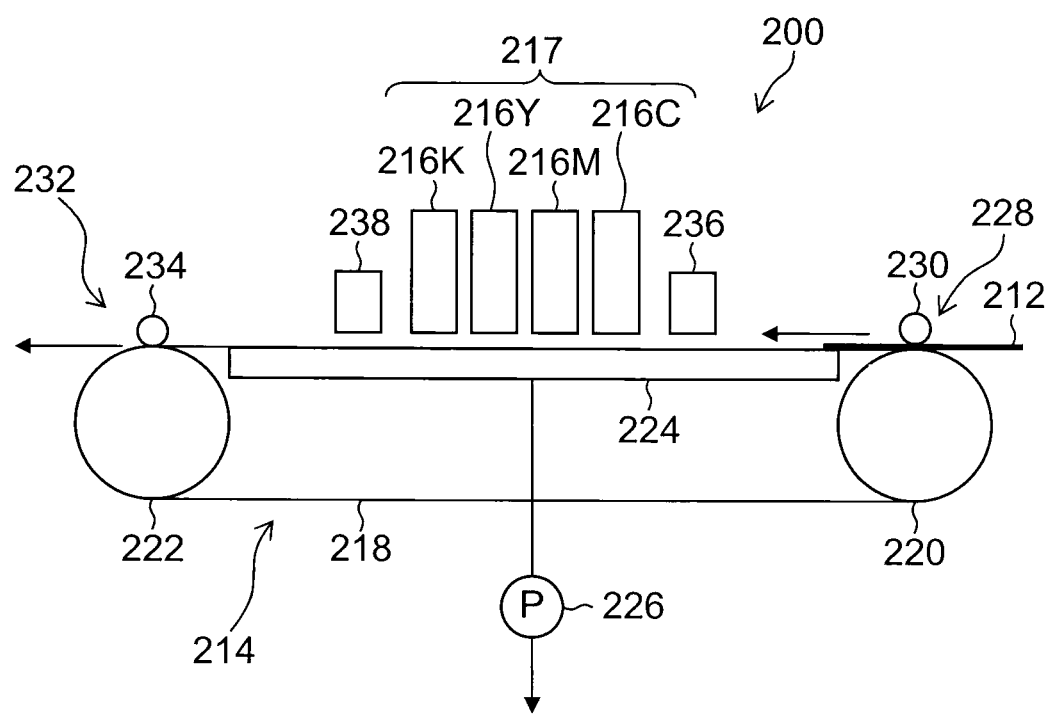
FIG. 14 is a general schematic drawing of an image forming apparatus relating to an embodiment of the present invention.

FIG. 14 is a general schematic drawing of an inkjet recording apparatus which employs a color prediction LUT created by the color prediction method shown in the present embodiment. The inkjet recording apparatus 200 shown in FIG. 14 is an on-demand type of inkjet recording apparatus, which includes a recording medium conveyance unit 214 that holds and conveys a recording medium 212, and an image formation unit 217 equipped with inkjet heads 216C, 216M, 216Y, 216K corresponding to the respective colors CMYK.

The recording medium conveyance unit 214 includes: an endless conveyance belt 218 which is provided with a plurality of suction holes (not illustrated) in a recording medium holding region where a recording medium 212 is held; conveyance rollers (a drive roller 220 and an idle roller 222) about which the conveyance belt 218 is wrapped; a chamber 224 which is provided on a rear side of the conveyance belt 218 in a recording medium holding region (on a surface opposite to a recording medium holding surface where the recording medium 212 is held) and which is connected to suction holes (not illustrated) provided in the recording medium holding region; and a vacuum pump 226 which generates negative pressure in the chamber 224.

A pressing roller 230 for preventing floating of the recording medium 212 is provided in an introduction unit 228 where a recording medium 212 is introduced, and furthermore, a pressing roller 234 is also provided in an output unit 232 where the recording medium 212 is output.

A recording medium 212 which has been introduced via the introduction unit 228 receives negative pressure from the suction holes provided in the recording medium holding region, and is thereby suctioned and held on the recording medium holding region of the conveyance belt 218.

A temperature adjustment unit 236 for adjusting the surface temperature of the recording medium 212 to a prescribed range is provided in the conveyance path of the recording medium 212, in a stage prior to the image formation unit 217 (to the upstream side in terms of the recording medium conveyance direction), and furthermore, a reading apparatus (reading sensor) 238 for reading an image recorded on the recording medium 212 is provided in a stage after the image formation unit 217 (to the downstream side in terms of the recording medium conveyance direction).

As shown in FIG. 14, the inkjet heads 216C, 216M, 216Y, 216K are arranged in this order from the upstream side in terms of the recording medium conveyance direction. When the recording medium 212 passes directly below the inkjet heads 216C, 216M, 216Y, 216K, inks of respective colors of K, C, M, Y are ejected onto the recording medium 212, thereby forming a desired color image.

The image formation unit 217 is not limited to the mode described above. For instance, it is also possible to include inkjet heads corresponding to LC (light cyan) and LM (light magenta). Furthermore, the arrangement order of the inkjet heads 216C, 216M, 216Y, 216K can be changed appropriately.

The inkjet heads 216C, 216M, 216Y, 216K may employ a piezoelectric method which ejects ink using a distorting deformation of a piezoelectric element, or may employ a thermal method which ejects ink by using a film boiling effect by heating ink.

A possible example of a structure of an inkjet head based on a piezoelectric method is a mode including a plurality of nozzles for ejecting ink, pressure chambers connected to the respective nozzles, and piezoelectric elements provided at the pressure chambers.

Furthermore, an inkjet head based on a thermal method may employ a mode in which a heater for heating ink inside a pressure chamber (liquid chamber) is provided, instead of the piezoelectric element in the piezoelectric method. The nozzle arrangement of the inkjet heads 216C, 216M, 216Y, 216K may employ a single-row arrangement, staggered arrangement or matrix arrangement, or the like.

FIG. 14 shows a compositional example in which a full line type of inkjet head is provided, but it is also possible to adopt a composition in which a serial type of inkjet head is provided.

(Description of Control System)

Figure 15:
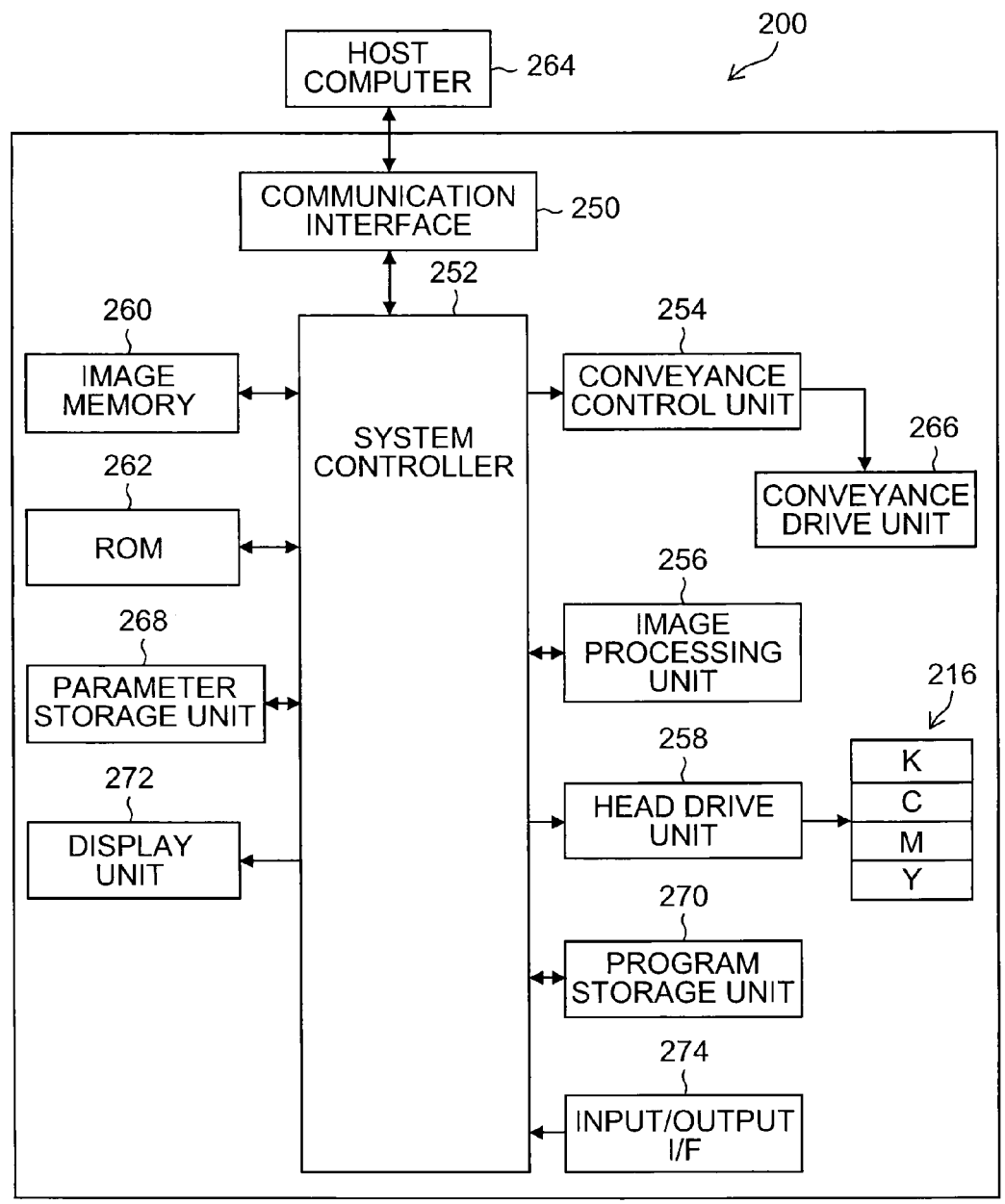
FIG. 15 is a block diagram showing a schematic composition of a control system of the image forming apparatus shown in FIG. 14.

FIG. 15 is a block diagram showing the approximate composition of the control system of the inkjet recording apparatus 200. As shown in FIG. 15, the inkjet recording apparatus 200 includes a communications interface 250, a system controller 252, a conveyance control unit 254, an image processing unit 256, and a head drive unit 258, as well as an image memory 260 and a ROM 262.

The communications interface 250 is an interface unit for receiving raster image data which is transmitted by a host computer 264. The communications interface 250 may employ a serial interface, such as a universal serial bus (USB), or a parallel interface, such as a Centronics device. It is also possible to install a buffer memory (not illustrated) for achieving high-speed communications in the communications interface 250.

The system controller 252 is constituted by a central processing unit (CPU) and peripheral circuits of same, and the like, and functions as a control apparatus which controls the whole of the inkjet recording apparatus 200 in accordance with a prescribed program, as well as functioning as a calculating apparatus which performs various calculations and also functioning as a memory controller for the image memory 260 and the ROM 262.

In other words, the system controller 252 controls the various sections, such as the communications interface 250, the conveyance control unit 254, and the like, as well as controlling communications with the host computer 264 and reading and writing to and from the image memory 260 and the ROM 262, and the like, and generating control signals which control the respective units described above.

Image data sent from the host computer 264 is input to the inkjet recording apparatus 200 via the communications interface 250, and prescribed image processing is carried out by the image processing unit 256.

The image processing unit 256 is a control unit which has signal (image) processing functions for carrying out various treatments, corrections and other processing in order to generate a signal for controlling printing from the image data, and which supplies the generated print data (dot data) to the head drive unit 258.

When prescribed signal processing has been carried out in the image processing unit 256, an ejected droplet volume (droplet ejection volume) and an ejection timing of the inkjet heads 216 (inkjet heads 216C, 216M, 216Y, 216K) are controlled via the head drive unit 258 on the basis of the print data (halftone image data).

By this means, a desired dot size and dot arrangement are achieved. The head drive unit 258 shown in FIG. 15 may also include a feedback control system for maintaining uniform drive conditions in the inkjet head 216.

The color prediction method (color conversion method) described previously can be applied suitably in the image processing unit 256 shown in FIG. 15. The color prediction processing referred to here may be based on reference to a color prediction LUT or may be based on calculation.

For example, it is possible to use the color prediction method (color conversion method) described above to carry out color conversion processing (color conversion processing for converting input image data expressed by RGB into CMYK data) on the image data before halftone processing.

The conveyance control unit 254 controls the conveyance timing and conveyance speed of the recording medium 212 (see FIG. 1) on the basis of print data generated by the image processing unit 256. A conveyance drive unit 266 in FIG. 15 includes a motor which drives a drive roller 220 (222) of a recording medium conveyance unit 214 that conveys the recording medium 212, and the conveyance control unit 254 functions as a driver for this motor.

The image memory (temporary storage memory) 260 incorporates the functions of a temporary storage device for temporarily storing image data input via the communications interface 250, as well as the functions of a development area for various programs stored in the ROM 262 and a calculation work area for the CPU (for example, a work area for the image processing unit 256). A volatile memory (RAM) which can be read from and written to sequentially is used as the image memory 260.

The ROM 262 stores a program which is executed by the CPU of the system controller 252, and various data and control parameters, and the like, which are necessary for controlling the respective sections of the apparatus, and performs reading and writing of data via the system controller 252. The ROM 262 is not limited to a memory such as a semiconductor element, and may also employ a magnetic medium, such as a hard disk. Furthermore, the storage unit may also include an external interface and use a detachable storage medium.

The parameter storage unit 268 stores various control parameters which are necessary for the operation of the inkjet recording apparatus 200. The system controller 252 reads out parameters required for control purposes, as appropriate, and updates (rewrites) parameters as and where necessary.

The program storage unit 270 is a storage device which stores control programs for operating the inkjet recording apparatus 200. In controlling the respective units of the apparatus, the system controller 252 (or respective units of the apparatus themselves) reads out the required control program from the program storage unit 270 and the control program is duly executed.

The program storage unit 270 may store software (a program) for causing the inkjet recording apparatus 200 to execute the respective steps of the color prediction method described above. Furthermore, it is also possible to adopt a composition in which a color prediction LUT is stored and the image processing unit 256 refers to the color prediction LUT via the system controller 252.

Moreover, in the image processing unit 256 in FIG. 15, it is also possible to store a program which executes color conversion by referring to the color prediction LUT.

The input interface (UF) 274 employs an information input device, such as a keyboard, mouse, joystick, or the like. The information input via the input interface 274 is sent to the system controller 252.

Although not shown in FIG. 15, a desirable mode is one which includes a display unit as a device for displaying various information sent from the system controller 252. One example of a display unit is a touch panel type monitor apparatus as shown in FIG. 14, or a generic display apparatus, such as an LCD monitor, or the like. Moreover, it is also possible to provide a sound (voice) output unit, such as a speaker.

The respective units shown in FIG. 14 and FIG. 15 can function as hardware for executing the respective steps of the color prediction method, the color prediction LUT generation method, and the image processing method described above.

Compositional conditions relating to the color prediction method, color prediction LUT generation method, image processing method and image processing apparatus according to the embodiment of the present invention can be modified, appended and deleted within a range that does not depart from the essence of the present invention.

APPENDIX

As has become evident from the detailed description of the embodiment of the present invention given above, the present specification includes disclosure of various technical ideas including at least the modes described below.

(First Mode):

A color prediction method, including: a coloring material use limit setting step of setting a provisional use limit value for coloring material in a multi-dimensional color space corresponding to a plurality of colors; a patch group creating step of creating a group of patches including a plurality of patches based on a previously determined combination of coloring material use values, in respect of a region where a sum total of coloring material use values for a previously determined combination of coloring materials is no more than the set use limit value; a patch group outputting step of outputting the created group of patches to a medium; a color measurement step of performing color measurement of the group of patches; a color measurement value inferring step of inferring a color measurement value for a virtual patch in a region exceeding the coloring material use limit, by extrapolation on the basis of the color measurement values of patches on which color measurement has been performed; and a color predicting step of predicting a color corresponding to a combination of coloring material use values in the color space, by interpolation on the basis of color measurement values obtained by the color measurement step and the color measurement value inferring step.

According to this mode, even if the coloring material use amount is limited but ambiguities remain and an accurate coloring material use limit is not known, then a virtual coloring material use limit is set artificially, the color measurement values of virtual patches in a region that exceeds the coloring material use limit are inferred by extrapolation and the color measurement values in the region exceeding the coloring material use limit are predicted by interpolation using the inferred color measurement values. Therefore, it is possible to predict colors in relation to any input exceeding the coloring material use limit.

Moreover, since the prediction accuracy is especially high in the case of color measurement values in a region in the vicinity of the provisional coloring material use limit, then even if the coloring material use limit has changed, it is not necessary to carry out a series of processes involving the creation of a group of patches, output of a group of patches and color measurement.

(Second Mode):

The patch group creating step includes an extrapolation calculation patch group creating step of creating a group of patches for extrapolation calculation of mixed colors, which have color measurement values at the coloring material use limit or in the vicinity of but not exceeding the coloring material use limit, and which are used as learning data in an extrapolation calculation in the color measurement value inferring step.

According to this mode, desirable extrapolation calculation is carried out using color measurement results for an extrapolation calculation patch group.

By including the range of variation of the coloring material use limit in the vicinity of the coloring material use limit, the accuracy of color prediction in the range of variation of the coloring material use limit is improved.

(Third Mode):

The color measurement value inferring step includes a base grid square predicting step of predicting a color measurement value of a base grid square in a region exceeding the coloring material use limit in the color space, by extrapolation using the color measurement values of the generated group of patches for extrapolation calculation.

According to this mode, since the color measurement values of base grid squares in a region exceeding the coloring material use limit are predicted, then it is possible to carry out an interpolation calculation using color measurement values in the base grid squares of the region exceeding the coloring material use limit (Fourth Mode):

The extrapolation calculation is carried out for each one of previously divided regions, in the color measurement value inferring step.

In this mode, desirably, an extrapolation calculation is carried out in sequence from a region near the point of origin.

(Fifth Mode):

The color measurement value inferring step includes a region expanding step of expanding a region where learning data corresponding to the group of patches for extrapolation calculation is not present, so as to include another region where the learning data is present, when carrying out an extrapolation calculation in a region where the learning data is not present.

According to this mode, it is also possible to carry out an extrapolation calculation in a region where there is no learning data corresponding to the group of patches for extrapolation calculation.

(Sixth Mode):

The patch group creating step includes a non-linearity correction patch group creating step of generating a group of monochromatic patches for correcting non-linearity in a variation of a color measurement value when a coloring material use amount for a monochromatic coloring material is varied.

According to this mode, non-linearity of the color measurement values for each color is corrected, and it is possible to achieve more accurate color prediction.

In this mode, it is possible to improve correction accuracy by using finer increments for segments where there is strong non-linearity.

(Seventh Mode):

The patch group creating step includes an interpolation calculation base patch group creating step of generating patches of mixed colors for determining a base grid square which is used in an interpolation calculation in the color predicting step.

According to this mode, it is possible to carry out desirable interpolation calculation on the basis of color measurement values of a base grid square.

(Eighth Mode):

The plurality of colors includes, at least, yellow, magenta, cyan and black.

In this mode, it is possible to include colors of light magenta and light cyan, and the like.

(Ninth Mode):

The coloring material is a colorant included in a color ink which is used in image formation by an inkjet method, or in a toner which is used in image formation by an electrophotographic method.

According to this mode, the color prediction method relating to the present invention can be applied to image formation based on an inkjet method and image formation based on an electrophotographic method.

(Tenth Mode):

A color conversion lookup table generation method, including: a coloring material use limit setting step of setting a provisional use limit value for coloring material in a multi-dimensional color space corresponding to a plurality of colors; a patch group creating step of creating a group of patches including a plurality of patches based on a previously determined combination of coloring material use values, in respect of a region where a sum total of coloring material use values for a previously determined combination of coloring materials is not more than the set use limit value; a patch group outputting step of outputting the created group of patches to a medium; a color measurement step of performing color measurement of the group of patches; a color measurement value inferring step of inferring a color measurement value for a virtual patch in a region exceeding the coloring material use limit, by extrapolation on the basis of the color measurement values of patches on which color measurement has been performed; a color predicting step of predicting a color corresponding to a combination of coloring material use values in the color space, by interpolation on the basis of color measurement values obtained in the color measurement step and the color measurement value inferring step, and determining a color conversion relationship in relation to the combination of coloring material use values in the color space; and a color conversion lookup table generating step of generating a color conversion lookup table which indicates a conversion relationship between the determined combination of coloring material use limits of a plurality of colors in the color space, and the predicted color.

According to this mode, even if the coloring material use amount is limited, but an accurate coloring material use limit is not identified and ambiguities remain, then a coloring material use limit is set artificially, and a color measurement value of a virtual patch in a region exceeding the coloring material use limit is inferred by extrapolation. Therefore, it is possible to accurately predict a color in relation to an input exceeding the coloring material use limit, and desirable color conversion processing can be carried out.

Furthermore, even if the coloring material use amount has changed, it is not necessary to change or regenerate the color conversion lookup table.

(Eleventh Mode):

The color conversion lookup table generating step generates a color conversion lookup table which is used for conversion from a device-dependent color space to a device-independent color space.

An example of a device-dependent color space is one based on color values for coloring materials (CMYK values). An example of a device-independent color space is one based on CIE-XYZ values or L*a*b* values.

(Twelfth Mode):

The color conversion lookup table generating step generates a color conversion lookup table which is used for conversion from a device-independent color space to a device-dependent color space.

According to the eleventh and twelfth modes, it is possible to apply color prediction (color conversion) to processing of a color management system (CMS).

(Thirteenth Mode):

An image processing method, including: a coloring material use limit setting step of setting a provisional use limit value for coloring material in a multi-dimensional color space corresponding to a plurality of colors; a patch group creating step of creating a group of patches including a plurality of patches based on a previously determined combination of coloring material use values, in respect of a region where a sum total of coloring material use values for a previously determined combination of coloring materials is not more than the set use limit value; a patch group outputting step of outputting the created group of patches to a medium; a color measurement step of performing color measurement of the group of patches; a color measurement value inferring step of inferring a color measurement value for a virtual patch in a region exceeding the coloring material use limit, by extrapolation on the basis of the color measurement values of patches on which color measurement has been performed; a color predicting step of predicting a color corresponding to a combination of coloring material use values in the color space, by interpolation on the basis of color measurement values obtained in the color measurement step and the color measurement value inferring step, and determining a color conversion relationship in relation to the combination of coloring material use values in the color space; and an image processing step of applying color conversion processing to input image data using the determined conversion relationship.

According to this mode, desirably, devices corresponding to the respective steps described in the second mode to the ninth mode are provided.

(Fourteenth Mode):

An image processing apparatus, including: a coloring material use limit setting device which sets a provisional use limit value for coloring material in a multi-dimensional color space corresponding to a plurality of colors; a patch group creating device which creates a group of patches including a plurality of patches based on a previously determined combination of coloring material use values, in respect of a region where a sum total of coloring material use values for a previously determined combination of coloring materials is not more than the set use limit value; a patch group output device which outputs the created group of patches to a medium; a color measurement device which performs color measurement of the group of patches; a color measurement value inferring device which infers a color measurement value for a virtual patch in a region exceeding the coloring material use limit, by extrapolation on the basis of the color measurement values of patches on which color measurement has been performed; a color prediction device which predicts a color corresponding to a combination of coloring material use values in the color space, by interpolation on the basis of color measurement values obtained by the color measurement device and the color measurement value inferring device, and determines a color conversion relationship in relation to the combination of coloring material use values in the color space; and an image processing device which carries out image processing using the determined conversion relationship.

Furthermore, the present invention discloses a color prediction program, and a storage medium storing a color prediction program, which causes a computer to execute: a coloring material use limit setting step of setting a provisional use limit value for coloring material in a multi-dimensional color space corresponding to a plurality of colors; a patch group creating step of creating a group of patches including a plurality of patches based on a previously determined combination of coloring material use values, in respect of a region where a sum total of coloring material use values for a previously determined combination of coloring materials is no more than the set use limit value; a patch group outputting step of outputting the created group of patches to a medium; a color measurement value inferring step of inferring a color measurement value for a virtual patch in a region exceeding the coloring material use limit, by extrapolation on the basis of the color measurement values of patches on which color measurement has been performed; and a color predicting step of predicting a color corresponding to a combination of coloring material use values in the color space, by interpolation on the basis of color measurement values obtained by the color measurement step and the color measurement value inferring step.

Moreover, the present invention discloses a color prediction program and a storage medium storing a color prediction program, which causes a compute to execute the respective steps relating to the second mode to the ninth mode.

Furthermore, the present specification discloses a color conversion lookup table generating program, which causes a computer to execute: a coloring material use limit setting step of setting a provisional use limit value for coloring material in a multi-dimensional color space corresponding to a plurality of colors; a patch group creating step of creating a group of patches including a plurality of patches based on a previously determined combination of coloring material use values, in respect of a region where a sum total of coloring material use values for a previously determined combination of coloring materials is no more than the set use limit value; a patch group outputting step of outputting the created group of patches to a medium; a color measurement step of performing color measurement of the group of patches; a color measurement value inferring step of inferring a color measurement value for a virtual patch in a region exceeding the coloring material use limit, by extrapolation on the basis of the color measurement values of patches on which color measurement has been performed; a color predicting step of predicting a color corresponding to a combination of coloring material use values in the color space, by interpolation on the basis of color measurement values obtained by the color measurement step and the color measurement value inferring step, and determining a color conversion relationship in relation to the combination of coloring material use values in the color space; a color conversion lookup table generating step of generating a color conversion lookup table which indicates a conversion relationship between the determined combination of coloring material use limits of a plurality of colors in the color space, and the predicted color; and a color conversion lookup table generating program which causes a computer to execute the respective steps in the eleventh and twelfth modes, and a storage medium on which this color conversion lookup table generating program is stored.

Furthermore, the present specification discloses an image processing program, and a storage medium storing a program, which causes a computer to execute: a coloring material use limit setting step of setting a use limit value for coloring material in a multi-dimensional color space corresponding to a plurality of colors; a patch group creating step of creating a group of patches including a plurality of patches based on a previously determined combination of coloring material use values, in respect of a region where a sum total of coloring material use values for a previously determined combination of coloring materials is no more than the set use limit value; a patch group outputting step of outputting the created group of patches to a medium; a color measurement step of performing color measurement of the group of patches; a color measurement value inferring step of inferring a color measurement value for a virtual patch in a region exceeding the coloring material use limit, by extrapolation on the basis of the color measurement values of patches on which color measurement has been performed; a color predicting step of predicting a color corresponding to a combination of coloring material use values in the color space, by interpolation on the basis of color measurement values obtained by the color measurement step and the color measurement value inferring step, and determining a color conversion relationship in relation to the combination of coloring material use values in the color space; and an image processing step of applying color conversion processing to input image data using the determined conversion relationship.

It is also possible to adopt a composition in which the respective steps in the program described above are carried out by the respective devices according to the fourteenth mode.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A color prediction method comprising:
   a coloring material use limit setting step of setting a provisional use limit value for coloring material in a multi-dimensional color space corresponding to a plurality of colors;
   a patch group creating step of creating a group of patches including a plurality of patches based on a previously determined combination of coloring material use values, in respect of a region where a sum total of coloring material use values for a previously determined combination of coloring materials is not more than the set use limit value;
   a patch group outputting step of outputting the created group of patches to a medium;
   a color measurement step of performing color measurement of the group of patches;
   a color measurement value inferring step of inferring a color measurement value for a virtual patch in a region exceeding the coloring material use limit, by extrapolation on the basis of the color measurement values of patches on which color measurement has been performed; and
   a color predicting step of predicting a color corresponding to a combination of coloring material use values in the color space, by interpolation on the basis of color measurement values obtained in the color measurement step and the color measurement value inferring step;
   wherein the patch group creating step includes an extrapolation calculation patch group creating step of creating a group of patches for extrapolation calculation of mixed colors, which have color measurement values at the coloring material use limit or in the vicinity of but not exceeding the coloring material use limit, and which are used as learning data in an extrapolation calculation in the color measurement value inferring step.

2. The color prediction method as defined in claim 1, wherein the color measurement value inferring step includes a base grid square predicting step of predicting a color measurement value of a base grid square in a region exceeding the coloring material use limit in the color space, by extrapolation using the color measurement values of the generated group of patches for extrapolation calculation.

3. The color prediction method as defined in claim 1, wherein the extrapolation calculation is carried out for each one of previously divided regions, in the color measurement value inferring step.

4. The color prediction method as defined in claim 1, wherein the color measurement value inferring step includes a region expanding step of expanding a region where learning data corresponding to the group of patches for extrapolation calculation is not present, so as to include another region where the learning data is present, when carrying out an extrapolation calculation in a region where the learning data is not present.

5. The color prediction method as defined in claim 1, wherein the patch group creating step includes a non-linearity correction patch group creating step of generating a group of monochromatic patches for correcting non-linearity in a variation of a color measurement value when a coloring material use amount for a monochromatic coloring material is varied.

6. The color prediction method as defined in claim 1, wherein the patch group creating step includes an interpolation calculation base patch group creating step of generating patches of mixed colors for determining a base grid square which is used in an interpolation calculation in the color predicting step.

7. The color prediction method as defined in claim 1, wherein the plurality of colors includes, at least, yellow, magenta, cyan and black.

8. The color prediction method as defined in claim 1, wherein the coloring material is a colorant included in a color ink which is used in image formation by an inkjet method, or in a toner which is used in image formation by an electrophotographic method.

* * * * *